(12) United States Patent
Nakano et al.

(10) Patent No.: US 10,078,672 B2
(45) Date of Patent: Sep. 18, 2018

(54) SEARCH DEVICE, SEARCH METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Minato-ku, Tokyo (JP)

(72) Inventors: Wataru Nakano, Kanagawa (JP); Toshihiko Manabe, Kanagawa (JP); Tomoharu Kokubu, Kanagawa (JP); Masumi Inaba, Tokyo (JP)

(73) Assignees: TOSHIBA SOLUTIONS CORPORATION, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 108 days.

(21) Appl. No.: 13/845,847

(22) Filed: Mar. 18, 2013

(65) Prior Publication Data

US 2013/0254190 A1    Sep. 26, 2013

Related U.S. Application Data

(63) Continuation of application No. PCT/JP2012/066183, filed on Jun. 25, 2012.

(30) Foreign Application Priority Data

Mar. 21, 2012 (JP) .................................. 2012-063349

(51) Int. Cl.
    *G06F 17/30*    (2006.01)
(52) U.S. Cl.
    CPC .... *G06F 17/30554* (2013.01); *G06F 17/3064* (2013.01); *G06F 17/30707* (2013.01)

(58) Field of Classification Search
CPC combination set(s) only.
See application file for complete search history.

(56) References Cited

U.S. PATENT DOCUMENTS

| 6,564,213 B1* | 5/2003 | Ortega | G06F 17/3064 |
| 6,714,920 B1* | 3/2004 | Arai | G06F 17/30017 705/26.1 |

(Continued)

FOREIGN PATENT DOCUMENTS

| JP | 09-198396 | 7/1997 |
| JP | 2001-249933 | 9/2001 |

(Continued)

OTHER PUBLICATIONS

Arias et al., "Context-Based Personalization for Mobile Web Search", VLDB '08, ACM, 2008.*

(Continued)

*Primary Examiner* — Farhan Syed
(74) *Attorney, Agent, or Firm* — Amin, Turocy & Watson LLP

(57) ABSTRACT

According to an embodiment, a search device includes a first storage to store therein a keyword group generated by grouping keyword candidates which are to be candidates for a search keyword according to a rule set in advance; a first acquisition unit to acquire a first recommended keyword which is the keyword candidate partially including an input string not yet been entered; a second acquisition unit to acquire a second recommended keyword which is included in the keyword group to which the first recommended keyword belongs and which is the keyword candidate other than the first recommended keyword; an output unit to output a search screen for displaying the first recommended keyword and the second recommended keyword in a selectable way; and a search unit to perform a search with the first (Continued)

recommended keyword or the second recommended keyword selected on the search screen as the search keyword.

14 Claims, 22 Drawing Sheets

(56) References Cited

U.S. PATENT DOCUMENTS

| | | | | |
|---|---|---|---|---|
| 7,389,271 | B2* | 6/2008 | Arai | G06F 17/30017 705/14.1 |
| 7,730,030 | B1* | 6/2010 | Xu | G06Q 10/10 707/617 |
| 7,885,844 | B1* | 2/2011 | Cohen | G06Q 10/10 |
| 7,962,463 | B2* | 6/2011 | Cava | G06F 17/30864 707/706 |
| 8,626,804 | B2* | 1/2014 | Xu | G06Q 10/10 707/817 |
| 8,694,350 | B1* | 4/2014 | Cohen | G06Q 10/10 705/7.13 |
| 8,868,592 | B1* | 10/2014 | Weininger | G06F 17/3064 707/767 |
| 8,930,350 | B1* | 1/2015 | Herscovici | G06F 17/30 707/723 |
| 9,122,376 | B1* | 9/2015 | Brotherston | G06F 17/30637 |
| 9,396,485 | B2* | 7/2016 | Freishtat | G06Q 30/02 |
| 9,414,006 | B2* | 8/2016 | Song | H04N 5/44513 |
| 9,619,525 | B2* | 4/2017 | Adams | G06F 17/3053 |
| 2005/0144065 | A1* | 6/2005 | Calabria | G06Q 30/02 705/14.68 |
| 2005/0198068 | A1* | 9/2005 | Mukherjee | G06F 17/30864 |
| 2009/0043741 | A1* | 2/2009 | Kim | G06F 17/3064 |
| 2010/0293162 | A1* | 11/2010 | Odland et al. | 707/736 |
| 2011/0225511 | A1* | 9/2011 | Xu | G06Q 10/10 715/753 |
| 2011/0264682 | A1* | 10/2011 | Song | G06F 17/30781 707/769 |
| 2016/0275127 | A1* | 9/2016 | Freishtat | G06Q 30/02 |

FOREIGN PATENT DOCUMENTS

| | | |
|---|---|---|
| JP | 2002-269135 | 9/2002 |
| JP | 2009-237755 | 10/2009 |
| JP | 2010-086472 | 4/2010 |
| JP | 2010-140264 | 6/2010 |
| JP | 2010-182340 | 8/2010 |
| JP | 2010-198477 | 9/2010 |
| JP | 2011-070532 | 4/2011 |
| WO | 2005-091825 | 10/2005 |

OTHER PUBLICATIONS

Hyvonen et al., "Semantic Autocompletion", : ASWC 2006, LNCS 4185, pp. 739-751, Springer-Verlag Berlin Heidelberg 2006.*
International Search Report for PCT/JP2012/066183 dated Jul. 24, 2012.
Written Opinion for PCT/JP2012/066183 dated Jul. 24, 2012.
Japanese Office Action for Japanese Patent Application No. 2012-063349 dated Oct. 22, 2013.
Notification of the First Office Action for Chinese Patent Application No. 201280002861.2 dated Jan. 28, 2016, 11 pages.
Chinese Office Action for Chinese Patent Application No. 201280002861.2 dated Aug. 29, 2016.
"Baidu quietly launched search tips", Netease Science and Technology, http://tech.163.com/09/0121/10/5063JL24000915BF.html, Jan. 21, 2009.

* cited by examiner

FIG.3

```
                    ┌100
101 ─ <KEYWORD ID="1000">
102 ─   <WRITTEN FORM>日本動物園</WRITTEN FORM>
103 ─   <PRONUNCIATION>NIHON DOBUTSUEN</PRONUNCIATION>
104 ─   <WORD TYPE>PROPER NOUN</WORD TYPE>
105 ─   <SEMANTIC TYPE>TOURIST FACILITY</SEMANTIC TYPE>
106 ─   <SCORE INFORMATION>30.52</SCORE INFORMATION>
      </KEYWORD>
```

FIG.4

```
                    ┌200
201 ─ <GROUP ID="12">
202 ─   <BELONGING KEYWORD>
203 ─     <KEYWORD ID>184</KEYWORD ID>
203 ─     <KEYWORD ID>982</KEYWORD ID>
203 ─     <KEYWORD ID>1000</KEYWORD ID>
203 ─     <KEYWORD ID>20765</KEYWORD ID>
        </BELONGING KEYWORD>
      </GROUP>
```

```
                    ┌300
301 ─ <KEYWORD ID="1000">
302 ─   <BELONGING GROUP ID>3</BELONGING GROUP ID>
302 ─   <BELONGING GROUP ID>12</BELONGING GROUP ID>
302 ─   <BELONGING GROUP ID>14</BELONGING GROUP ID>
302 ─   <BELONGING GROUP ID>76</BELONGING GROUP ID>
      </KEYWORD>
```

```
401 ─── <RULE GROUP ID="12">
402 ───   <SUB RULE 1>
403 ───     <CONDITION 1 KEY="SEMANTIC TYPE">
404 ───       <VALUE>観光施設</VALUE>
404 ───       <VALUE>THEME PARK</VALUE>
            </CONDITION 1>
403 ───     <CONDITION 2 KEY="WORD TYPE">
404 ───       <VALUE>PROPER NOUN</VALUE>
            </CONDITION 2>
          </SUB RULE 1>
402 ───   <SUB RULE 2>
403 ───     <CONDITION 1 KEY="SEMANTIC TYPE">
404 ───       <VALUE>TOURIST SITE</VALUE>
            </CONDITION 1>
          </SUB RULE 2>
        </RULE>
```

FIG.13

| SEARCH ID | USER ID | SEARCH EXECUTION TIME | SEARCH KEYWORD | KEYWORD ID |
|---|---|---|---|---|
| 23324 | 332 | 20110901171535 | 埼玉博物館 | 1088 |
| 23325 | 332 | 20110901171643 | 横浜博物館 | 1921 |
| 23326 | 1045 | 20110901171658 | 日本ドームシティ | 2211 |
| 23326 | 1045 | 20110901171658 | イベント | 154 |

FIG.17
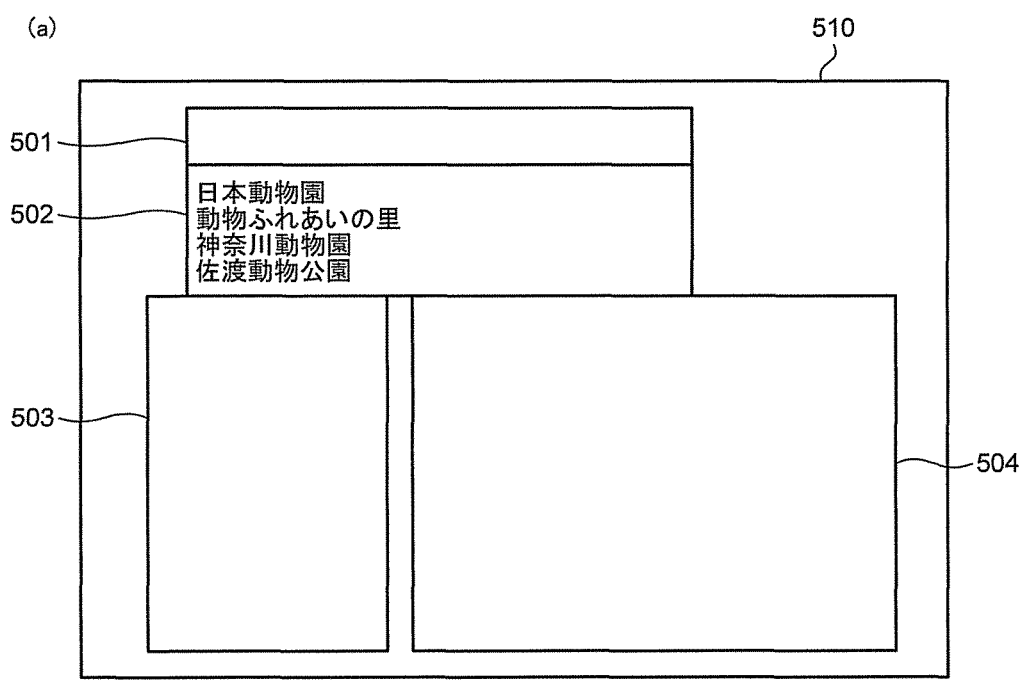
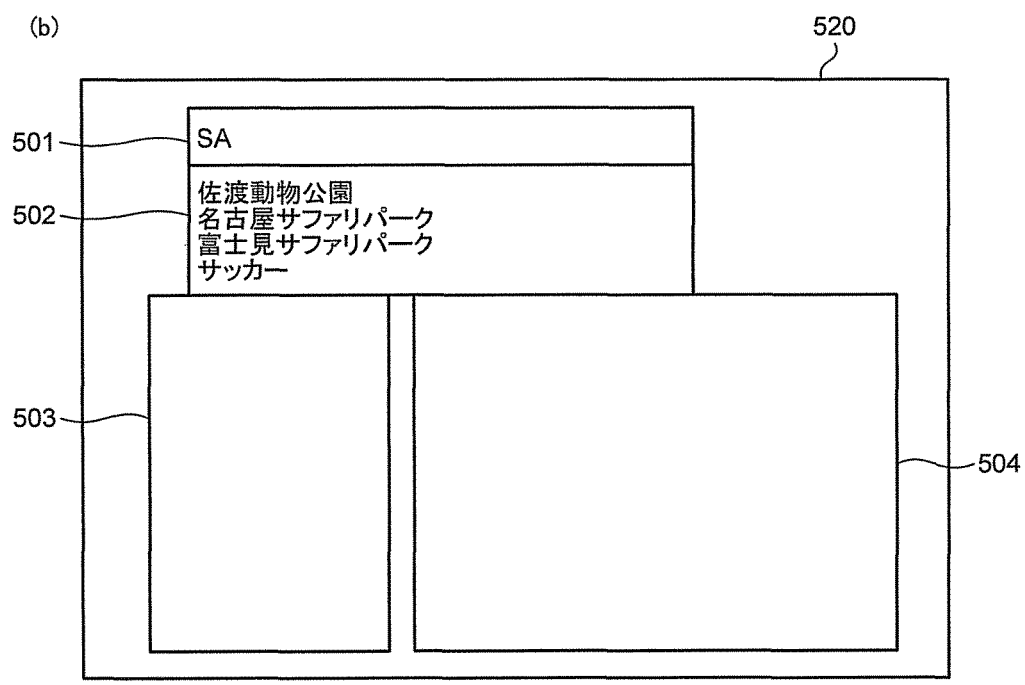

FIG.20
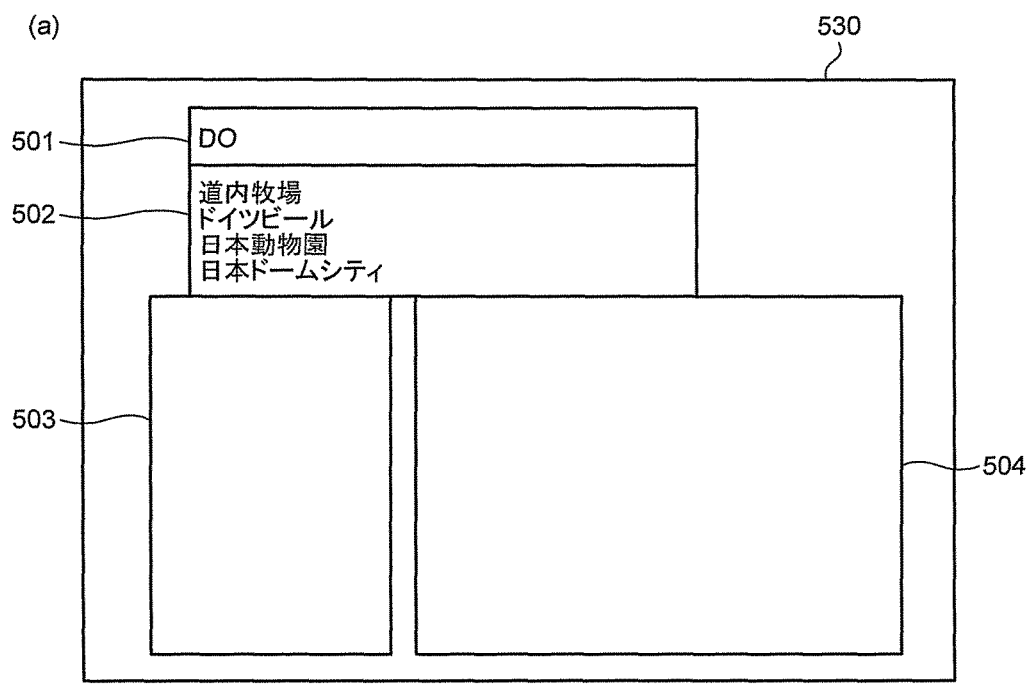
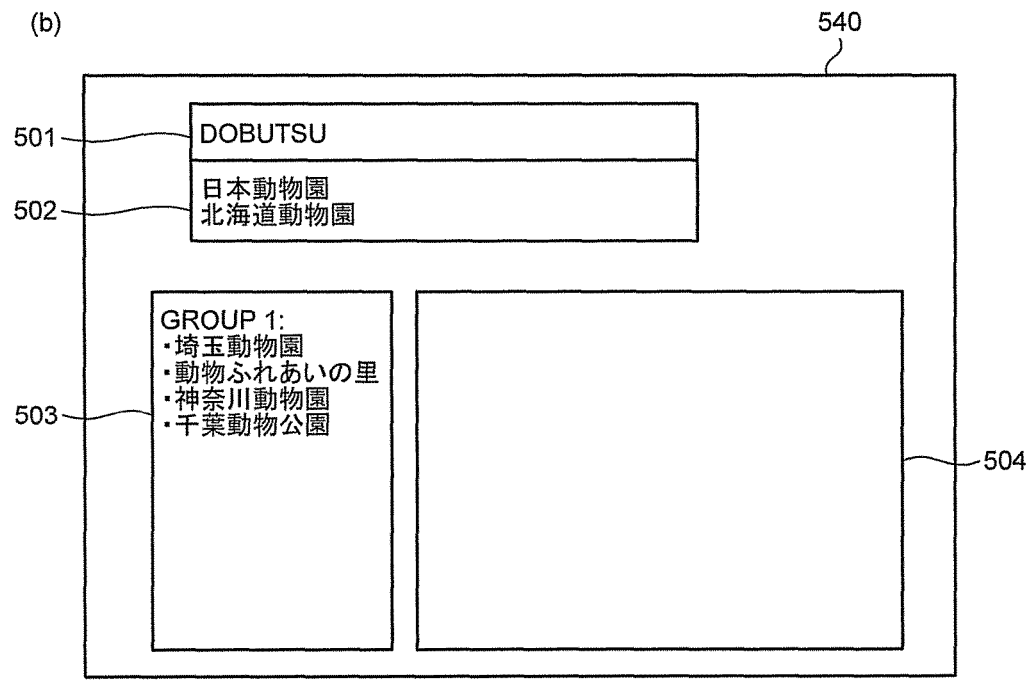

FIG.22

| KEYWORD WRITTEN FORM | GROUP ID | GROUP NAME |
|---|---|---|
| 東京 | 12 | LIST OF TOURIST SITES IN 東京 |
| 東京 | 38 | LIST OF UNIVERSITIES IN 東京 |
| 東京電機 | 25 | LIST OF PRODUCTS OF 東京電機 |
| 日本ドーム | 87 | LIST OF EVENTS AT 日本ドーム |

FIG.24
(a)
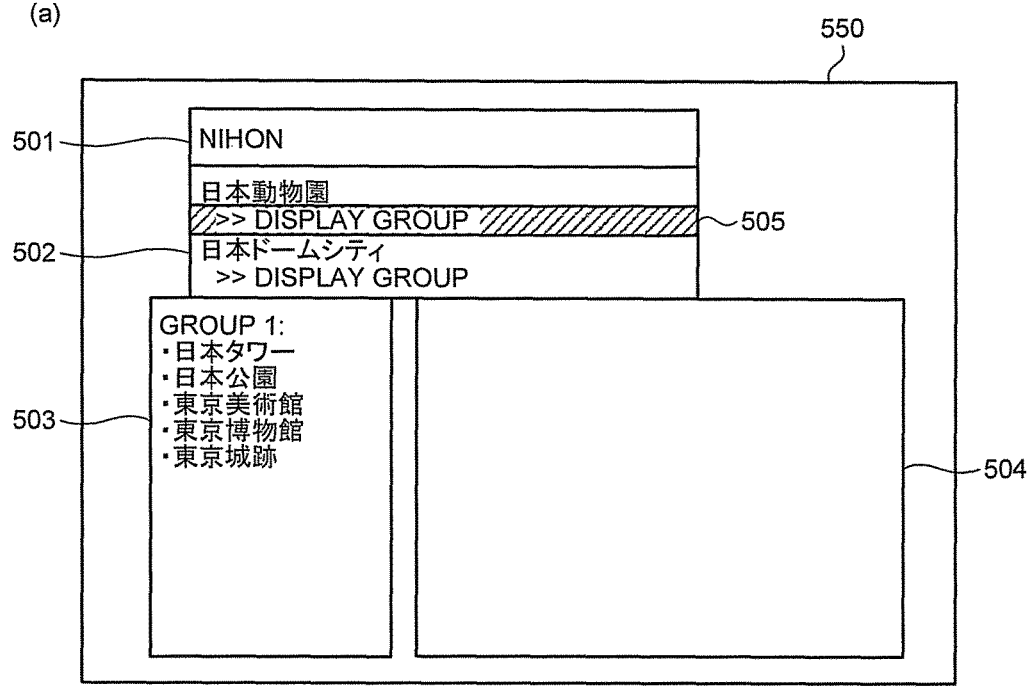
(b)
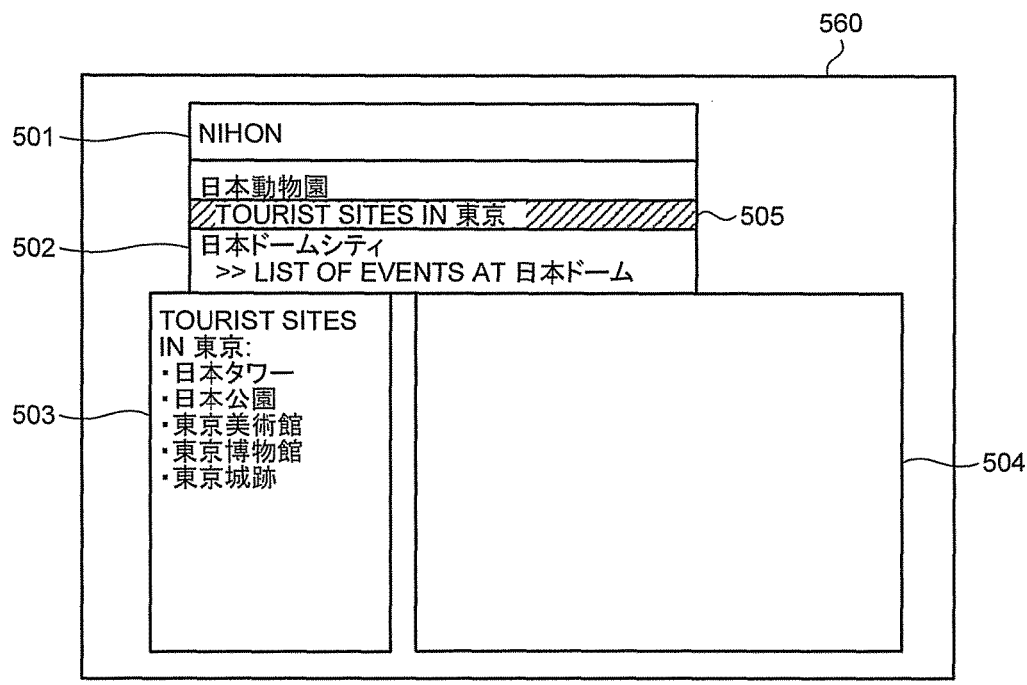

SEARCH DEVICE, SEARCH METHOD, AND COMPUTER PROGRAM PRODUCT

CROSS-REFERENCE TO RELATED APPLICATIONS

This application is a continuation of PCT international application Ser. No. PCT/JP2012/066183 filed on Jun. 25, 2012 which designates the United States, incorporated herein by reference, and which claims the benefit of priority from Japanese Patent Application No. 2012-063349, filed on Mar. 21, 2012, the entire contents of which are incorporated herein by reference.

FIELD

Embodiments described herein relate generally to a search device, a search method, and a computer program product.

BACKGROUND

With computerization of documents and spread of World Wide Web (abbreviated as WWW), document search is becoming widely used in daily life and in various fields of business. The document search here refers to a technology of searching for various types of content according to a search request with a specified search keyword. Types of content to be searched for by the document search include, in addition to a document itself such as a reference material, various objects such as a web page including text data, video content including text data as metadata, and the like.

The search results by the document search are output as a list of titles of pieces of content matching the search keyword, for example. A user obtains desired information by performing, and repeating if necessary, the steps of inputting a search keyword, selecting a piece of content from a list of titles output as the search results and checking the piece of content.

Conventionally, various methods are being proposed to reduce the steps and save the trouble regarding the document search as described above, and to improve the work efficiency of a user. One of such methods is input completion of a search keyword (a suggestion function). The search suggestion function is a technology of acquiring, and presenting to a user, candidates for a search keyword whose written expressions or readings of Japanese partially match an input string. By using this search suggestion function, a user can issue a search request by selecting a search keyword from presented candidates, without having to fully input a search keyword, and the trouble of inputting a search keyword can be saved. However, with the search suggestion function, since candidates for a search keyword whose written expressions or readings of Japanese partially match that of an input string are presented to a user, if a plurality of search keywords that are different in the written expression or reading of Japanese are to be sequentially specified and the search is to be repeated, the input of a string has to be performed every time from the start.

As a method for saving the trouble of sequentially specifying a plurality of search keywords and repeating the search, there is known a technology of presenting, when a search keyword is input, together with search results based on the search keyword, other words related to the search keyword used for the search as the candidates for the next search keyword. According to this technology, a user can issue a new search request by selecting the next search keyword from the presented candidates for the search keyword, and the trouble of sequentially specifying a plurality of search keywords and repeating the search can be reduced. However, with this technology, candidates for the next search keyword cannot be presented until a search keyword is entered, and to cause other candidates related to a candidate for a presented search keyword to be presented, search has to be performed every time by entering a search keyword.

As described above, conventional technologies for reducing the steps of document search and saving the trouble has yet to be improved from the stand point of improving the work efficiency of a user, and a technology that can further improve the efficiency is desired.

BRIEF DESCRIPTION OF THE DRAWINGS

FIG. 3 is a diagram illustrating an example of keyword information held in a keyword storage unit;

FIG. 4 is a diagram illustrating an example of group information held in a keyword group storage unit;

FIG. 13 is a diagram illustrating an example of search keyword history information held in a search keyword storage unit;

FIGS. 17A and 17B are diagrams illustrating example screens of a search screen of the third embodiment;

FIGS. 20A and 220B are diagrams illustrating example screens of a search screen of the fourth embodiment;

FIG. 22 is a diagram illustrating an example of a keyword group output determination rule held in a keyword group output determination rule storage unit;

FIGS. 24A and 24B are diagrams for describing modified examples of a search screen.

DETAILED DESCRIPTION

According to an embodiment, a search device includes a first storage, a first acquisition unit, a second acquisition unit, an output unit, and a search unit. The first storage unit is configured to store therein a keyword group generated by grouping keyword candidates which are to be candidates for a search keyword according to a rule set in advance. The first acquisition unit is configured to acquire a first recommended keyword which is the keyword candidate partially including an input string not yet been entered. The second acquisition unit is configured to acquire a second recommended keyword which is included in the keyword group to which the first recommended keyword belongs and which is the keyword candidate other than the first recommended keyword. The output unit is configured to output a search screen for displaying the first recommended keyword and the second recommended keyword in a selectable way. The search unit is configured to perform a search with the first recommended keyword or the second recommended keyword selected on the search screen as the search keyword.

Various embodiments will be described with reference to drawings. The embodiments described below are examples of application to a server in a server-client information system.

Information System

Figure 1:
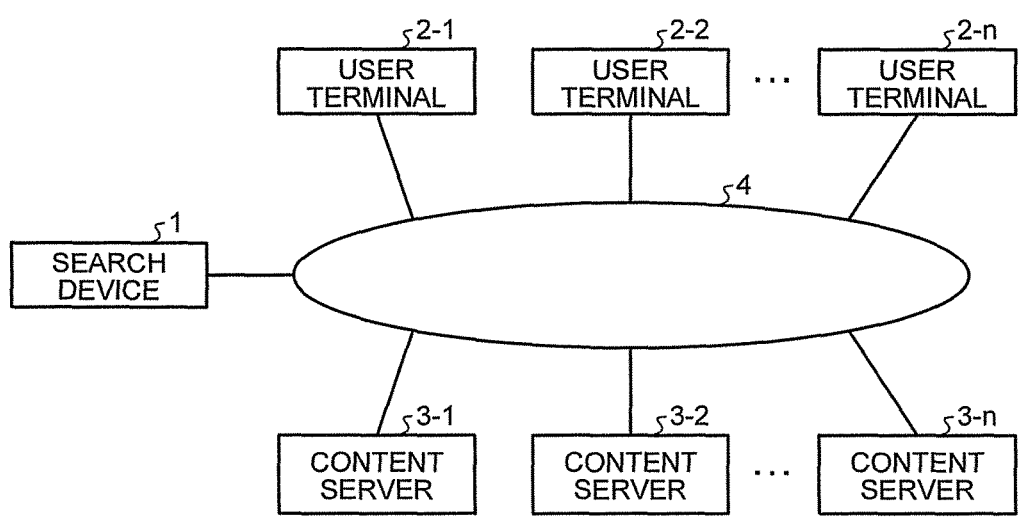
FIG. 1 is a configuration diagram of an information system including a search device of an embodiment.

First, an outline of an information system including a search device of an embodiment will be given. FIG. 1 is a configuration diagram of an information system including a search device 1 of an embodiment. As illustrated in FIG. 1, this information system has a configuration where a search device 1 that functions as a server that provides a search service, a plurality of user terminals 2-1, 2-2, . . . , 2-n (hereinafter, collectively referred to as "user terminal(s) 2") which are clients of the search device 1, and content servers 3-1, 3-2, . . . , 3-n (hereinafter, collectively referred to as "content server(s) 3") that store and manage various types of content are connected over a communication network 4.

The search device 1 is an information processing apparatus that provides a search service for performing a search for various types of content. As hardware configuration, the search device 1 may adopt a hardware configuration that uses a common computer which includes a control device, such as a CPU, an internal storage device, such as ROM or RAM, and an external storage device, such as a hard disk, a CD, a DVD or flash memory, for example. In this case, a functional configuration described later of the search device 1 may be realized by the computer executing a program, and a Web-based search service may be provided to a user, for example.

The user terminal 2 is a device used by a user who is to receive the search service. As the user terminal 2, various information processing terminals including, as hardware, an input device used by a user to perform various operations and a display device for displaying various kinds of information, and having a Web browser installed therein as software, such as personal computers, digital home appliances, tablet terminals, mobile phones and the like may be used. Also, a plurality of information processing apparatuses may be combined to configure one user terminal 2.

The content server 3 is a device that stores and manages various types of content published on the communication network 4. Like the search device 1, the content server 3 may adopt a hardware configuration that uses a common computer. The form of the communication network 4 is arbitrary, and the Internet, a LAN (Local Area Network) or the like may be used.

Additionally, the function of the content server 3 may be implemented in the search device 1. That is, the search device 1 may include the function of storing and managing various types of content, and provide a search service where the pieces of content managed by the search device 1 are the search targets. Furthermore, it is also possible to realize the function of the search device 1 by the user terminal 2.

With the information system in FIG. 1, when a user accesses the search device 1 by using the user terminal 2, the search device 1 causes a display screen of the user terminal 2 to display a search screen. Then, when the user issues a search request with a specified search keyword on the search screen, the search device 1 performs a search with various types of content managed by the content server 3 as the search targets, and returns, as search results, to the user terminal 2, a list of titles of pieces of content matching the search keyword, for example. Each title included in the list of titles is a link to a storage location of each piece of content managed by the content server 3. The user can access desired content and acquire necessary information by selecting a desired title from the list of titles.

Here, the search device 1 of the embodiment displays on the search screen, and presents to the user, as first recommended keywords, keyword candidates partially including an input string input by the user (an input string not yet been entered), among keyword candidates which are the candidates for the search keyword, so as to enable the user to perform an operation of specifying a search keyword with ease using the search screen. Also, at this time, other keyword candidates relevant to the first recommended keywords are displayed on the search screen as second recommended keywords, and are presented to the user. The first recommended keywords and the second recommended keywords displayed on the search screen are dynamically changed as the input string is changed, that is, as the input of an input string by the user progresses. The user can enter a search keyword and issue a search request to the search device 1 by selecting one of the first recommended keywords or the second recommended keywords displayed on the search screen.

Hereinafter, details of the search device 1 will be described as the first to fifth embodiments. Additionally, in the following, the search device 1 of the first embodiment will be expressed as a search device 1A, the search device 1 of the second embodiment will be expressed as a search device 1B, the search device 1 of the third embodiment will be expressed as a search device 1C, the search device 1 of the fourth embodiment will be expressed as a search device 1D, and the search device 1 of the fifth embodiment will be expressed as a search device 1E.

First Embodiment

Figure 2:
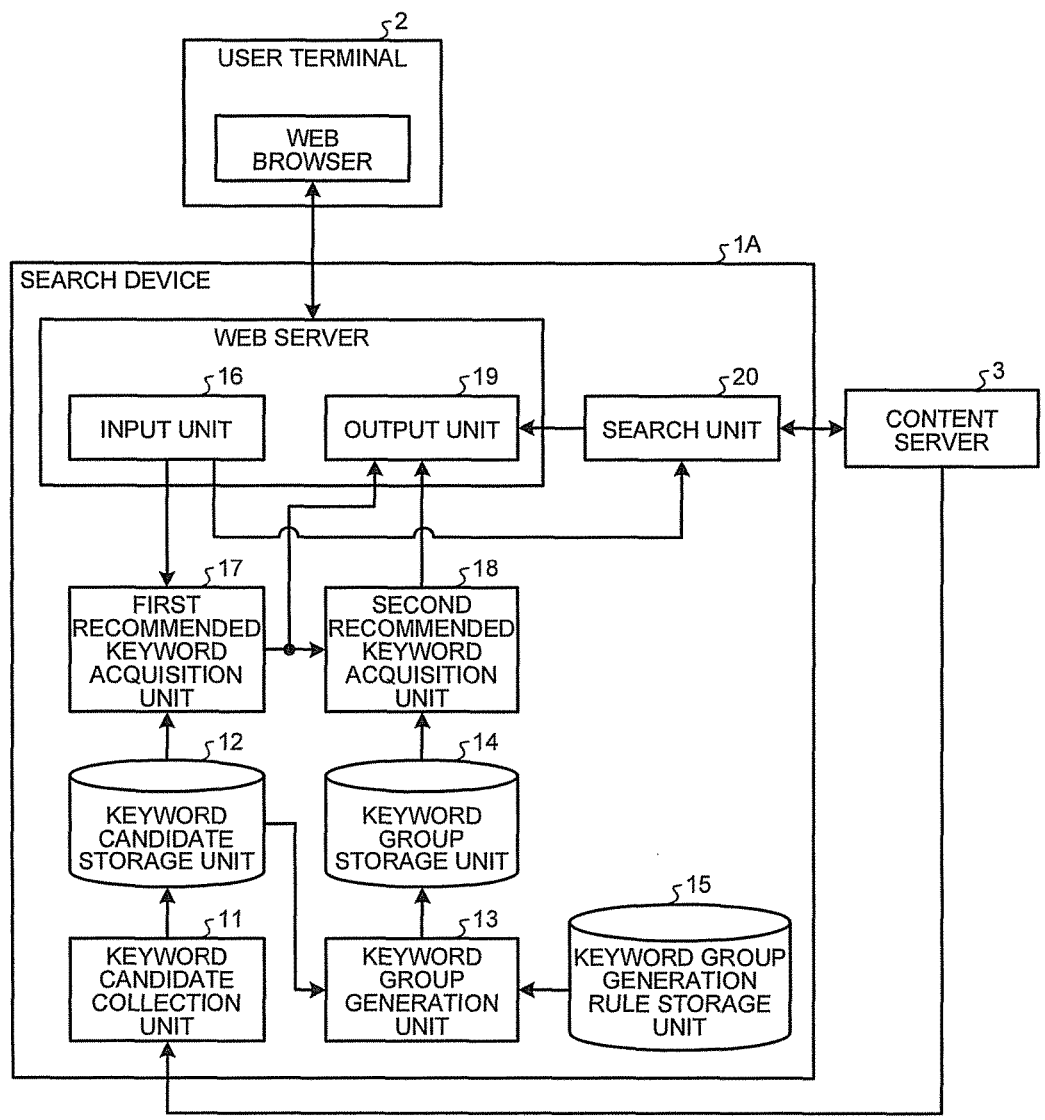
FIG. 2 is a block diagram illustrating a functional configuration of a search device of a first embodiment.

FIG. 2 is a block diagram illustrating a functional configuration of a search device 1A of the first embodiment. As illustrated in FIG. 2, the search device 1A of the present embodiment includes a keyword candidate collection unit 11, a keyword candidate storage unit 12, a keyword group generation unit 13, a keyword group storage unit 14, a keyword group generation rule storage unit 15, an input unit 16, a first recommended keyword acquisition unit 17, a second recommended keyword acquisition unit 18, an output unit 19 and a search unit 20.

The keyword candidate collection unit 11 collects keyword candidates which are to be candidates for a search keyword that is used when a user performs a search, and stores the collected keyword candidates in the keyword candidate storage unit 12. In the case a document such as a document created for business purposes or a patent document is the search target, for example, as a method of collecting the keyword candidates, there is a method of acquiring the document from the content server 3 and extracting keyword candidates from the document by a morphological analysis or the like, which is a known technology. Also, in addition to the morphological analysis mentioned above, various extraction methods may be used to extract keyword candidates from a document, such as named entity extraction, compound word extraction and the like. As for the named entity extraction, a known named entity extraction method as described in "'A Study of the Relations among Question Answering, Japanese Named Entity Extraction, and Named Entity Taxonomy', Yumi ICHIMURA, et al., IPSJ SIG Technical Report, NL-161-3, 2004" may be used, for example. Also, as for the compound word extraction, a known compound word extraction method as described in "Frantsi, K. and Ananiadou, S. 'Extracting Nested Collocations.', COLING 96, pp. 41-46, 1996" may be used, for example.

Additionally, in the case of extracting keyword candidates from a search target document, the keyword candidate collection unit 11 may extract only a specific word class, such as "noun", as the keyword candidate based on the result of the morphological analysis, or may extract only the keyword candidates of a specific type of semantic attributes, such as "place name" or "animal name", based on the result of the named entity extraction by the method mentioned above. Furthermore, in the case a document is written in the form of structural information, such as XML (Extensible Markup Language), the keyword candidate collection unit 11 may extract a specific part of the document as the keyword candidate based on the structural information by cutting out a text area surrounded by specific tags, such as "<TITLE>" or "<AUTHOR>", as one keyword candidate, for example.

Furthermore, the keyword candidate collection unit 11 may collect keyword candidates using various methods other than the methods, described above, of extracting keyword candidates from a search target document. For example, the keyword candidate collection unit 11 may collect keyword candidates from text data of a specific web page on the WWW selected in advance or dictionary data using an extraction method described above, and store keyword information of the collected keyword candidates in the keyword candidate storage unit 12. Also, the keyword candidate collection unit 11 may store, in the keyword candidate storage unit 12, only the keyword information of keyword candidates appearing in the search target document among the keyword candidates collected using the method. Moreover, in the case the search targets include a web page on the WWW or video content including metadata, the keyword candidate collection unit 11 may collect the keyword candidates using an extraction method described above from the text data of the web page which is a search target or the metadata of the video content which is a search target. Still further, in the case the content server 3 has a function of extracting words to be the keyword candidates from content using an extraction method described above, the keyword candidate collection unit 11 may collect the keyword candidates extracted from various types of content in advance by the content server 3.

The keyword candidate storage unit 12 stores therein the keyword candidates collected by the keyword candidate collection unit 11. Specifically, the keyword candidate storage unit 12 holds keyword information indicating each keyword candidate for all the keyword candidates collected by the keyword candidate collection unit 11.

FIG. 3 is a diagram illustrating an example of keyword information held in the keyword candidate storage unit 12. Keyword information 100 illustrated in FIG. 3 is an example of keyword information written in XML. However, the keyword information may be stored in the keyword candidate storage unit 12 in a format other than the XML format, such as a table structure, a plain text format in which a delimiter is inserted, or the like. Here, a case is assumed where each of four methods, the morphological analysis, the named entity extraction, the compound word extraction and the specific part extraction based on structural information, is performed on a search target document, and words of specific word classes or words with specific semantic attributes are extracted from the results as the keyword candidates.

The keyword information 100 includes a "keyword ID" 101 for identifying a keyword candidate, a "written expression" 102 of the keyword candidate, a "reading" 103 of the keyword candidate, a "word type" 104 indicating a type other than a type with respect to the meaning, such as a grammatical type of the keyword candidate, used for specifying the keyword candidate, a "semantic type" 105 indicating the type with respect to the meaning of the keyword candidate, and "score information" 106 indicating the priority level of the keyword candidate as a search keyword. The keyword information 100 in FIG. 3 indicates a keyword candidate whose "keyword ID" is "1000", whose "written expression" 102 is "日本動物園", whose "reading" 103 is "nihon dobutsuen", whose "word type" 104 is "proper noun", whose "semantic type" 105 is "tourist facility", and whose "score information" 106 is "30.52".

Additionally, regarding the "reading" 103 of the keyword information 100, it is given to a keyword candidate collected by the keyword candidate collection unit 11 by performing a morphological analysis on a keyword and connecting reading of each morpheme registered in a morphological analysis dictionary, for example. Also, regarding the "word type" 104, if, for example, a keyword candidate is obtained at the time of performing a morphological analysis on a document, its word class is written, and if it is acquired by another extraction method, the extraction method is described. Furthermore, the "semantic type" 105 can be acquired based on a result of applying the named entity extraction on a document or from the information in an external dictionary or encyclopedia. Still further, as the "score information" 106, a TF (Term Frequency, the number of appearance times of a keyword) or a DF (Document Frequency, the number of documents in which a keyword appears) in a document collection from which a keyword candidate is acquired may be used as it is, or it may be calculated by a tf-idf (term frequency-inverse document frequency) method which combines the above. Moreover, the "score information" 106 may be calculated by further combining fixed values based on the values of the word type 104 and the semantic type 105.

Additionally, in the case a plurality of keyword candidates having the same "written expression" 102 are extracted by different extraction methods, these keyword candidates are aggregated so that the pieces of keyword information 100 will be one. In this case, the "word types" 104 and the "semantic types" 105 may possibly be different depending on the extraction methods, and all of these will be described in the keyword information 100.

The keyword group generation unit 13 generates keyword groups by grouping keyword candidates collected by the keyword candidate collection unit 11 and stored in the keyword candidate storage unit 12, and stores the generated keyword groups in the keyword group storage unit 14. A keyword group generation rule stored in the keyword group generation rule storage unit 15 in advance is used for the grouping of the keyword candidates by the keyword group generation unit 13. Additionally, the keyword group generation unit 13 may generate keyword groups by grouping, in addition to the keyword candidates collected by the keyword candidate collection unit 11, keyword candidates included in external information, such as a concept dictionary, for example, holding words together with the relationship between the words, keyword candidates obtained by analyzing external documents such as web pages on the WWW, and the like.

The keyword group storage unit 14 stores therein the keyword groups generated by the keyword group generation unit 13. Specifically, the keyword group storage unit 14 holds, for each keyword group generated by the keyword group generation unit 13, group information indicating the keyword group.

FIG. 4 is a diagram illustrating an example of the group information held in the keyword group storage unit 14. The group information illustrated in FIG. 4 is written by a combination of two XML formats, i.e. first information 200 regarding each keyword group and second information 300 regarding a keyword group to which each keyword candidate belongs.

The first information 200 includes a "group ID" 201 for identifying a keyword group, and a "keyword ID" 203 for identifying each keyword candidate as a "belonging keyword" 202 indicating a keyword candidate belonging to the keyword group, for example. The example in FIG. 4 indicates that a keyword candidate whose "keyword ID" 203 is "184", a keyword candidate whose "keyword ID" 203 is "982", a keyword candidate whose "keyword ID" 203 is "1000", and a keyword candidate whose "keyword ID" 203 is "20765" belong to a keyword group whose "group ID" 201 is "12" as the "belonging keywords" 202. Additionally, the "keyword ID" 203 corresponds to the "keyword ID" 101 in the keyword information 100 in FIG. 3, and the same values indicate a same keyword candidate.

The second information 300 includes a "keyword ID" 301 for identifying a keyword candidate, and a "belonging group ID" 302 indicating a keyword group to which the keyword candidate belongs. The example in FIG. 4 indicates that a keyword candidate whose "keyword ID" 301 is "1000" belongs to a keyword group whose "belonging group ID" 302 is "3", a keyword group whose "belonging group ID" 302 is "12", a keyword group whose "belonging group ID" 302 is "14", and a keyword group whose "belonging group ID" 302 is "76". Additionally, the "keyword ID" 301 corresponds to the "keyword ID" 101 in the keyword information 100 in FIG. 3 and the "keyword ID" 203 in the first information 200, and the "belonging group ID" 302 corresponds to the "group ID" 201 in the first information 200, and the same values indicate a same keyword candidate or a same keyword group.

The keyword group generation rule storage unit 15 holds a keyword group generation rule used at the time of the keyword group generation unit 13 generating a keyword group.

Figure 5:
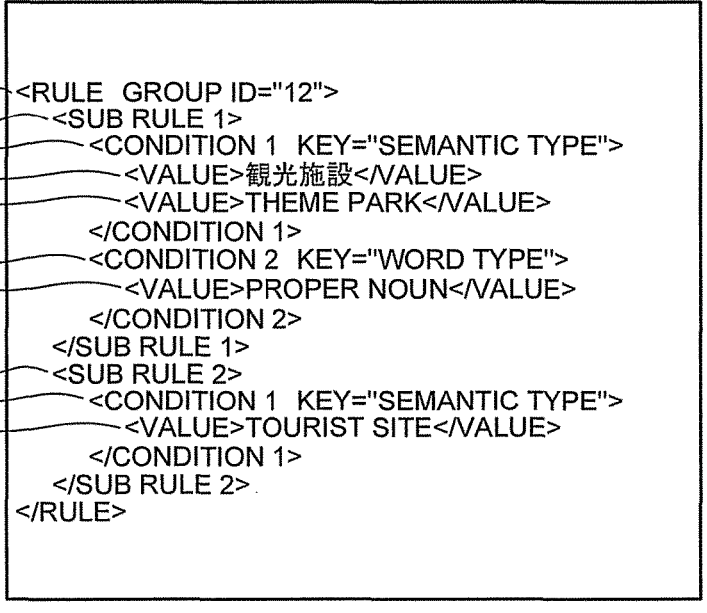
FIG. 5 is a diagram illustrating an example of a keyword group generation rule held in a keyword group generation rule storage unit.

FIG. 5 is a diagram illustrating an example of the keyword group generation rule held in the keyword group generation rule storage unit 15. A keyword group generation rule 400 illustrated in FIG. 5 is an example of the keyword group generation rule written in XML. Incidentally, the keyword group generation rule may be stored in the keyword group generation rule storage unit 15 in formats other than the XML, such as a table structure, text describing a logical expression, and the like. A case is assumed here where the keyword group generation rule that is used for generation of a keyword group is set for each keyword group to be generated.

The keyword group generation rule 400 includes a "group ID" 401 for identifying a keyword group that is generated by the rule, a "sub rule" 402 forming the rule, a "condition" 403 forming the "sub rule" 402, and a "value" 404 forming the "condition" 403. The example in FIG. 5 indicates that the rule for generating a keyword group whose "group ID" 401 is "12" is formed from two "sub rules" 402, and a sub rule 1 is formed from two "conditions" 403 and a sub rule 2 is formed from one "condition" 403. It is further indicated that a condition 1 of the sub rule 1 is a condition that the "semantic type" be held as a key attribute and a "tourist facility" and a "theme park" be held as values, and a condition 2 of the sub rule 1 is a condition that the "word type" be held as the key attribute and a "proper noun" be held as the value. It is also indicated that a condition 1 of the sub rule 2 is a condition that the "semantic type" be held as the key attribute, and a "place of interest" be held as the value. Moreover, the "group ID" 401 corresponds to the "group ID" 201 in the first information 200 in FIG. 4, and the same values indicate a same keyword group.

When the keyword group generation rule 400 illustrated in FIG. 5 is applied, a keyword candidate whose semantic type is a "tourist facility" or a "theme park" and whose word type is a "proper noun" and a keyword candidate whose semantic type is a "place of interest" are grouped together in the keyword information 100 illustrated in FIG. 3, and a keyword group with a group ID "12" is generated. The keyword group generation unit 13 can determine a keyword group to which each keyword candidate belongs by applying, on a one-by-one basis, a keyword group generation rule held in the keyword group generation rule storage unit 15 on every keyword candidate which has been collected by the keyword candidate collection unit 11 and whose keyword information is stored in the keyword candidate storage unit 12, and the generation of keyword groups is completed.

The input unit 16 is realized as a function of a Web server for performing web-based exchange of information with a Web browser of the user terminal 2. The input unit 16 receives various input operations performed by a user using various input devices such as a keyboard of the user terminal 2, a pointing device, a touch sensor and the like. For example, when a user inputs, using a keyboard, a string on a search screen described later that is displayed on a display device of the user terminal 2, the input unit 16 receives the input operation of the input string and transfers the input string to the first recommended keyword acquisition unit 17. Here, every time an input string is changed according to an operation of addition, deletion or the like of characters, the input unit 16 transfers the changed input string to the first recommended keyword acquisition unit 17. Additionally, an input string here is not restricted to include two or more characters, and if a user inputs one character in a predetermined input form, this is treated as an input string. Also, if a user performs an operation, on a search screen described later that is displayed on a display device of the user terminal 2, using a pointing device or a touch sensor, of selecting the first recommended keyword or the second recommended keyword, the input unit 16 receives the selection operation for the recommended keyword, cause the selected recommended keyword to be entered as the search keyword, and transfers the same to the search unit 20 together with a search request. The input unit 16 receives various other input operations performed by a user using an input device of the user terminal 2, and reflects the same on various processing of the search device 1A. For example, when a user enters an input string and performs an operation of instructing a search, the input unit 16 causes the input string at the time to be entered and transfers the same to the search unit 20 together with the search request.

The first recommended keyword acquisition unit 17 refers to the keyword candidate storage unit 12, and acquires a first recommended keyword, which is a keyword candidate partially including the input string received from the input unit 16. For example, the first recommended keyword acquisition unit 17 checks the input string received from the input unit 16 and the keyword information held in the keyword candidate storage unit 12 against each other. Then the first recommended keyword acquisition unit 17 acquires a keyword candidate satisfying an output condition described later, among the keyword candidates stored in the keyword candidate storage unit 12, as the first recommended keyword, and transfers the same to the second recommended keyword acquisition unit 18 and the output unit 19. Additionally, a concrete example of processing of the first recommended keyword acquisition unit 17 will be described later in detail.

The second recommended keyword acquisition unit 18 refers to the keyword group storage unit 14, and acquires a second recommended keyword, which is a keyword candidate other than the first keyword, included in the keyword group to which the first recommended keyword received from the first recommended keyword acquisition unit 17 belongs. For example, the second recommended keyword acquisition unit 18 checks the first recommended keyword received from the first recommended keyword acquisition unit 17 and the group information held in the keyword group storage unit 14 against each other. Then, the second recommended keyword acquisition unit 18 acquires, as the second recommended keyword, a keyword candidate which is other than the first recommended keyword and which is included in a keyword group satisfying an output condition described later, among keyword groups to which the first recommended keyword belongs, and transfers the second recommended keyword to the output unit 19. Additionally, a concrete example of processing of the second recommended keyword acquisition unit 18 will be described later in detail.

Like the input unit 16, the output unit 19 is realized as a function of a Web server for performing web-based exchange of information with a Web browser of the user terminal 2. The output unit 19 outputs a search screen necessary for a user to receive the search service, and causes a display device of the user terminal 2 to display the search screen. Here, in the case the first recommended keyword acquisition unit 17 has acquired a first recommended keyword and the second recommended keyword acquisition unit 18 has acquired a second recommended keyword, the search screen that the output unit 19 supplies to the user terminal 2 displays the first recommended keyword and the second recommended keyword in such a way that they can be selected as a search keyword. Also, in the case a search is performed by the search unit 20 described later, the search result is also displayed on the search screen.

Figure 6:
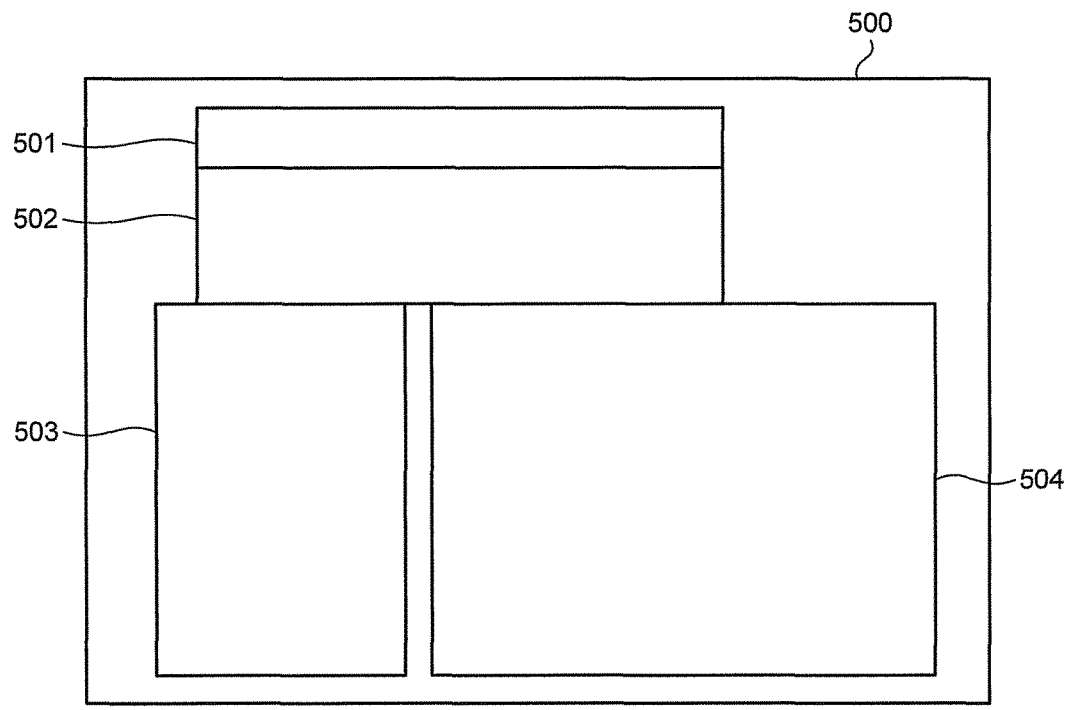
FIG. 6 is a diagram illustrating an example of a search screen that is displayed on a display device of a user terminal.

FIG. 6 is a diagram illustrating an example of the search screen displayed on a display device of the user terminal 2. A search screen 500 illustrated in FIG. 6 includes an input form 501 for a user to input a string, a first display area 502 for displaying, and allowing selection as a search keyword, a first recommended keyword acquired by the first recommended keyword acquisition unit 17, a second display area 503 for displaying, and allowing selection as a search keyword, a second recommended keyword acquired by the second recommended keyword acquisition unit 18, and a third display area 504 for displaying a search result of the search unit 20. Additionally, the first display area 502 may be provided as a fixed area in the search screen 500, or as a dynamic area which is displayed only when one or more first recommended keywords are acquired by the first recommended keyword acquisition unit 17 and whose size is changed according to the length and the number of first recommended keywords acquired by the first recommended keyword acquisition unit 17. Similarly, the second display area 503 may be provided as a fixed area in the search screen 500, or as a dynamic area which is displayed only when one or more second recommended keywords are acquired by the second recommended keyword acquisition unit 18 and whose size is changed according to the length and the number of second recommended keywords acquired by the second recommended keyword acquisition unit 18. Similarly, the third display area 504 may be provided as a fixed area in the search screen 500, or as a dynamic area which is displayed only when a search is performed by the search unit 20 and whose size is changed according to the length and the number of titles included in a list of titles of pieces of content which are the search results.

When a search keyword is entered by an operation of a user for entering an input string or for selecting a first recommended keyword or a second recommended keyword displayed on the search screen, the search unit 20 performs a search with the search keyword as the search query. Then, the search unit 20 transfers a list of titles of pieces of content matching the search keyword to the output unit 19 as the search results. The search results are presented to the user by being displayed in the third display area 504 on the search screen 500 in FIG. 6, for example.

Additionally, in the search device 1A of the present embodiment, the keyword candidate storage unit 12, the keyword group storage unit 14 and the keyword group generation rule storage unit 15 may be realized by the same storage device or by a plurality of storage devices. The storage device is a hard disk or flash memory, for example.

Moreover, the search device 1A of the present embodiment may be configured to not include the keyword candidate collection unit 11, the keyword group generation unit 13 and the keyword group generation rule storage unit 15. In this case, keyword information indicating a keyword candidate expected depending on the use environment may be stored in the keyword candidate storage unit 12 in advance, and group information generated by grouping keyword candidates according to an arbitrary keyword group generation rule in advance may be stored in the keyword group storage unit 14. Also, if information held in an external dictionary or encyclopedia is used as the keyword candidate storage unit 12, the search device 1A may further omit the keyword candidate storage unit 12.

Next, a concrete example of processing of the search device 1A of the present embodiment will be described using FIGS. 7 to 11. In the following, an explanation will be given, citing as an example a case of performing a search on text data in a web page on the WWW based on a search request from a user. Additionally, the search screen 500 in the format illustrated in FIG. 6 is assumed to be displayed on the display device of the user terminal 2.

Figure 7:
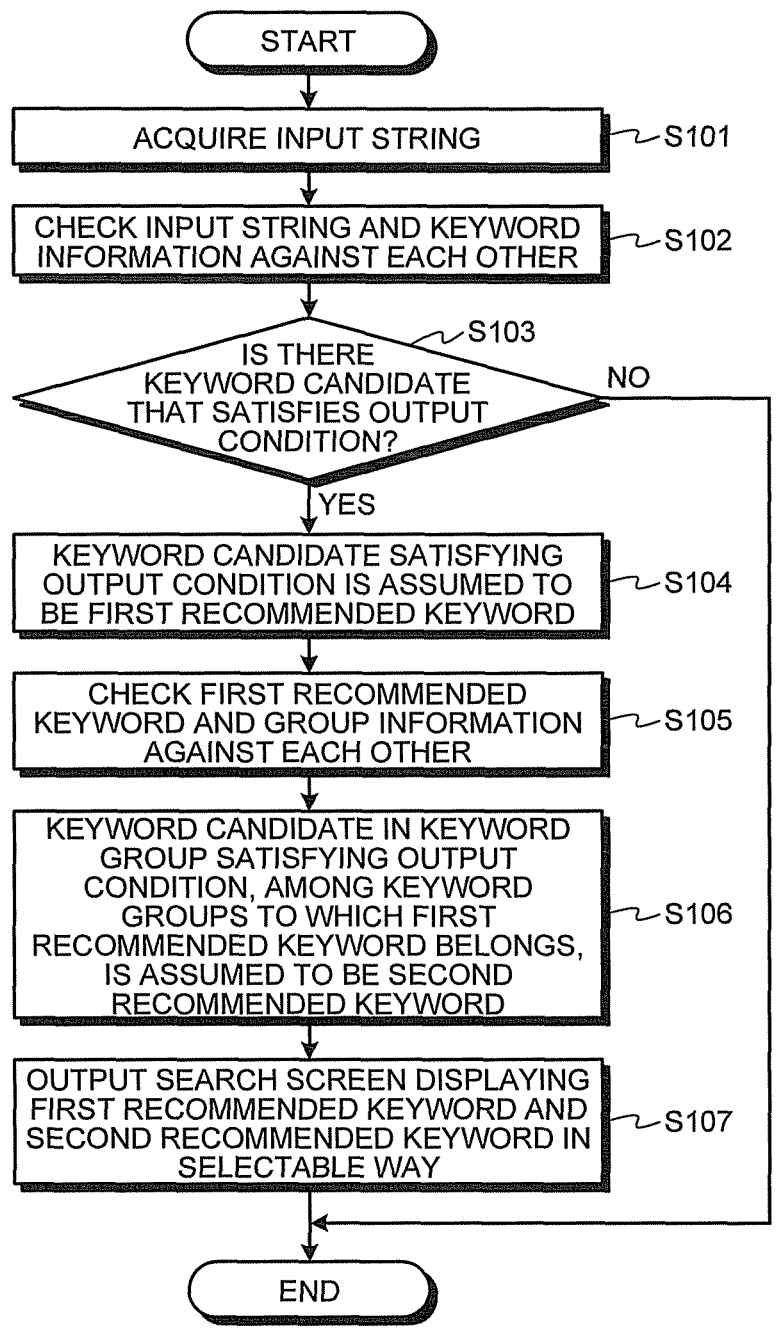
FIG. 7 is a flow chart illustrating a series of processes for displaying a first recommended keyword and a second recommended keyword according to an input string on a search screen in a selectable way.

FIG. 7 is a flow chart illustrating a series of processes for displaying a first recommended keyword and a second recommended keyword according to an input string on the search screen 500 in a selectable way. The series of processes illustrated as the flow chart in FIG. 7 is repeatedly performed every time an input string is changed.

First, the input unit 16 acquires an input string input by a user (step S101). Specifically, when the user inputs a string in the input form 501 on the search screen 500 using an input device such as a keyboard of the user terminal 2, the input string displayed on the input form 501 is transmitted to the first recommended keyword acquisition unit 17. For example, when the user inputs an input string "do", "do" is displayed on the input form 501 and, at the same time, is transmitted to the first recommended keyword acquisition unit 17.

Next, when the input string is received from the input unit 16, the first recommended keyword acquisition unit 17 checks the keyword information held in the keyword candidate storage unit 12 and the input string against each other (step S102), and determines whether or not there is a keyword candidate that satisfies an output condition, among keyword candidates stored in the keyword candidate storage unit 12 (step S103). Additionally, a concrete example of processing of the first recommended keyword acquisition unit 17 will be described later in detail.

In the case it is determined as a result of step S103 that there is no keyword candidate that satisfies the output condition (step S103: No), the process is ended. On the other hand, in the case there is a keyword candidate that satisfies the output condition (step S103: Yes), the first recommended keyword acquisition unit 17 transmits, as a first recommended keyword, the keyword candidate satisfying the output condition to the second recommended keyword acquisition unit 18 and the output unit 19 (step S104).

Next, when the first recommended keyword is received from the first recommended keyword acquisition unit 17, the second recommended keyword acquisition unit 18 checks group information held in the keyword group storage unit 14 and the first recommended keyword against each other (step S105), and identifies a keyword group to which the first recommended keyword belongs. Then, the second recommended keyword acquisition unit 18 transmits, to the output unit 19, as a second recommended keyword, a keyword candidate which is other than the first recommended keyword and which is included in a keyword group satisfying an output condition, among keyword groups to which the first recommended keyword belongs (step S106). Additionally, a concrete example of processing of the second recommended keyword acquisition unit 18 will be described later in detail.

Next, the output unit 19 outputs, to the user terminal 2, the search screen 500 which displays the first recommended keyword received from the first recommended keyword acquisition unit 17 in the first display area 502 and displays the second recommended keyword received from the second recommended keyword acquisition unit 18 in the second display area 503 (step S107), and ends the process.

Additionally, a description is given here assuming that every keyword candidate stored in the keyword candidate storage unit 12 belongs to at least one keyword group, but depending on the description of the keyword group generation rule held in the keyword group generation rule storage unit 15, it is possible that there is a keyword candidate that does not belong to any of the keyword groups. In this case, the second recommended keyword acquisition unit 18 may determine, prior to step S106, whether or not there is a keyword group to which the keyword candidate acquired as the first recommended keyword belongs, and the process of step S106 may be performed only when there is a keyword group to which the keyword candidate acquired as the first recommended keyword belongs.

Figure 8:
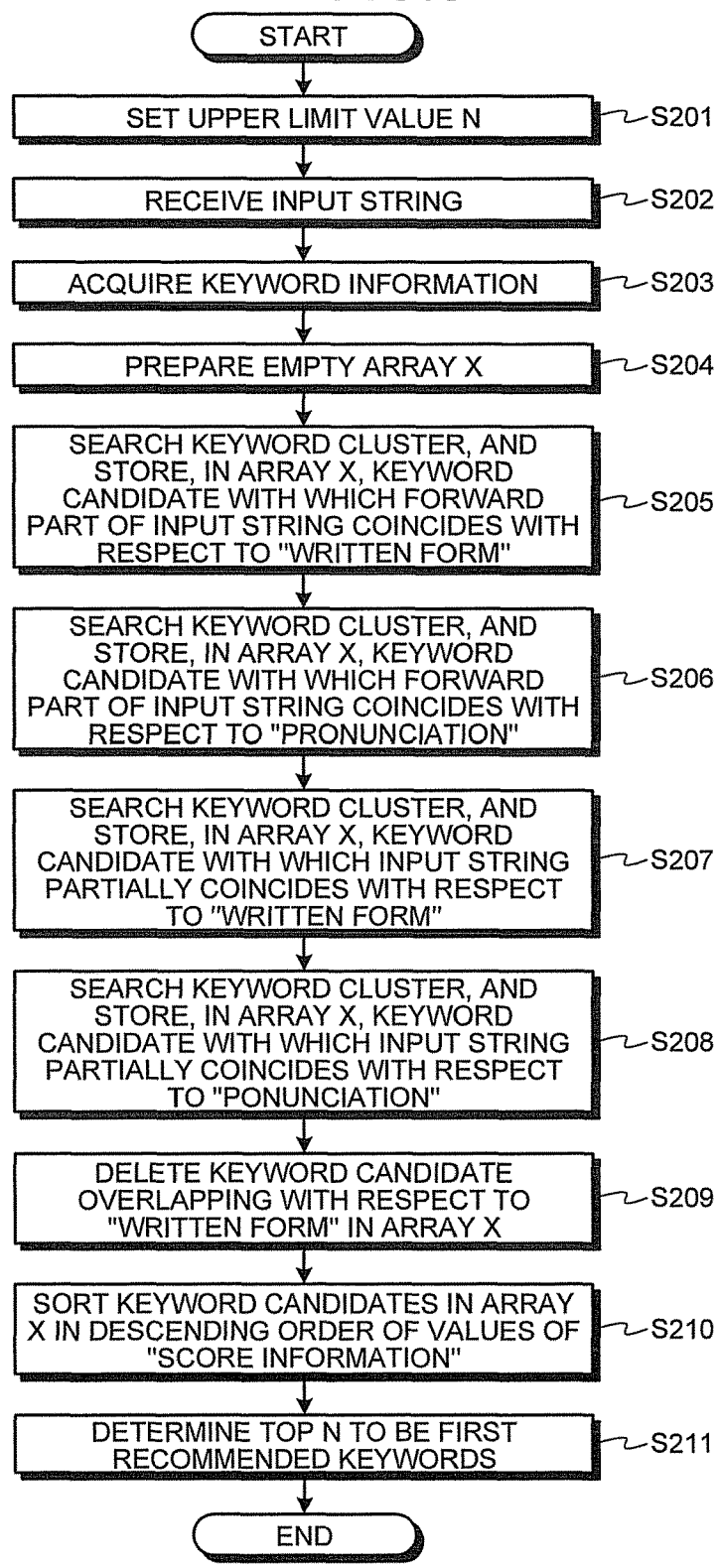
FIG. 8 is a flow chart illustrating an example of processing of a first recommended keyword acquisition unit.

Next, a concrete example of processing of the first recommended keyword acquisition unit 17 will be described. FIG. 8 is a flow chart illustrating an example of processing of the first recommended keyword acquisition unit 17. The series of processes illustrated as the flow chart in FIG. 8 is repeatedly performed every time an input string is changed.

The first recommended keyword acquisition unit 17 first sets an upper limit value N (for example, N=4) for the number of first recommended keywords (step S201). Then, the first recommended keyword acquisition unit 17 receives an input string from the input unit 16 (step S202). Furthermore, the first recommended keyword acquisition unit 17 acquires keyword information held in the keyword candidate storage unit 12 (step S203). Also, the first recommended keyword acquisition unit 17 prepares an empty array X for temporarily holding a keyword candidate (step S204).

The first recommended keyword acquisition unit 17 performs a search four times under different conditions on all of the keyword candidates (hereinafter, referred to as a keyword cluster) indicated by the keyword information acquired in step S203. That is, first, the first recommended keyword acquisition unit 17 searches for a keyword candidate with which the forward part of the input string received in step S202 coincides with respect to the "written expression" 102 in the keyword information 100 illustrated in FIG. 3, and stores the obtained keyword candidate in the array X (step S205). Next, the first recommended keyword acquisition unit 17 searches for a keyword candidate with which the forward part of the input string received in step S202 coincides with respect to the "reading" 103 in the keyword information 100 illustrated in FIG. 3, and stores the obtained keyword candidate in the array X, behind the keyword candidate obtained in step S205 (step S206). Furthermore, the first recommended keyword acquisition unit 17 searches for a keyword candidate with which the input string received in step S202 partially coincides with respect to the "written expression" 102 in the keyword information 100 illustrated in FIG. 3, and stores the obtained keyword candidate in the array X, behind the keyword candidate obtained in step S206 (step S207). Lastly, the first, recommended keyword acquisition unit 17 searches for a keyword candidate with which the input string received in step S202 partially coincides with respect to the "reading" 103 in the keyword information 100 illustrated in FIG. 3, and stores the obtained keyword candidate in the array X, behind the keyword candidate obtained in step S207 (step S208).

Next, in the case there are a plurality of keywords that overlap one another with respect to the "written expression" 102 among the keyword candidates stored in the array X, the first recommended keyword acquisition unit 17 deletes the second and the following keyword candidates (step S209). Then, the first recommended keyword acquisition unit 17 sorts the keyword candidates in the array X in the descending order of the values of the "score information" 106 in the keyword information 100 illustrated in FIG. 3 (step S210). Then, the first recommended keyword acquisition unit 17 determines, based on the upper limit value N set in step S201, maximum N keyword candidates from the top of the array X as the first recommended keywords (step S211), transfers the first recommended keywords to the second recommended keyword acquisition unit 18 and the output unit 19, and ends the series of processes.

Figure 9:
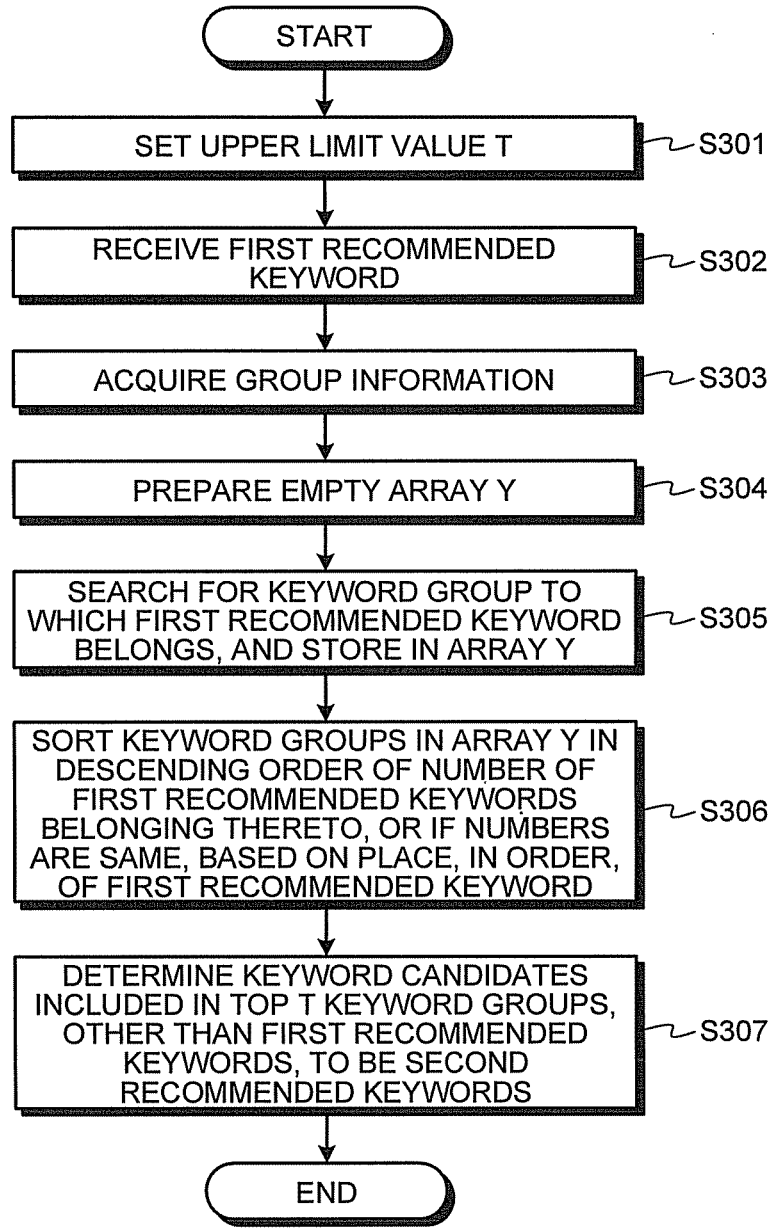
FIG. 9 is a flow chart illustrating an example of processing of a second recommended keyword acquisition unit.

Next, a concrete example of processing of the second recommended keyword acquisition unit 18 will be described. FIG. 9 is a flow chart illustrating an example of processing of the second recommended keyword acquisition unit 18. The series of processes illustrated as the flow chart in FIG. 9 is repeatedly performed every time the first recommended keyword is changed.

The second recommended keyword acquisition unit 18 first sets an upper limit value T (for example, T=3) for the number of keyword groups (step S301). Next, the second recommended keyword acquisition unit 18 receives a first recommended keyword from the first recommended keyword acquisition unit 17 (step S302). Then, the second recommended keyword acquisition unit 18 acquires group information held in the keyword group storage unit 14 (step S303). Also, the second recommended keyword acquisition unit 18 prepares an empty array Y for temporarily holding a keyword group (step S304).

Next, the second recommended keyword acquisition unit 18 searches for a keyword group to which the first recommended keyword received in step S302 belongs using the group information acquired in step S303, and stores the obtained keyword group in the array Y (step S305). Then, when the search is completed for every keyword group, the second recommended keyword acquisition unit 18 sorts the keyword groups stored in the array Y in the descending order of the number of first recommended keywords belonging to the keyword group (step S306). Here, if the numbers of first recommended keywords in the keyword groups are the same, the keyword group to which the first recommended keyword whose place in the order is higher (that is, the first recommended keyword whose place in the array X is in the front) belongs is assumed to be higher. For example, with a keyword group to which a first recommended keyword whose place in the order in the array X is at one and a first recommended keyword whose place is at five belong and a keyword group to which a first recommended keyword whose place in the order in the array X is at two and a first recommended keyword whose place is at three belong, the keyword group to which the first recommended keyword whose place is at one belongs is the higher keyword group.

Lastly, the second recommended keyword acquisition unit 18 extracts, based on the upper limit value T set in step S301, maximum T keyword groups from the top of the array Y, determines the keyword candidates included in the keyword groups, other than the first recommended keywords, to be the second recommended keywords (step S307), transfers the second recommended keywords to the output unit 19, and ends the series of processes.

Figure 10:
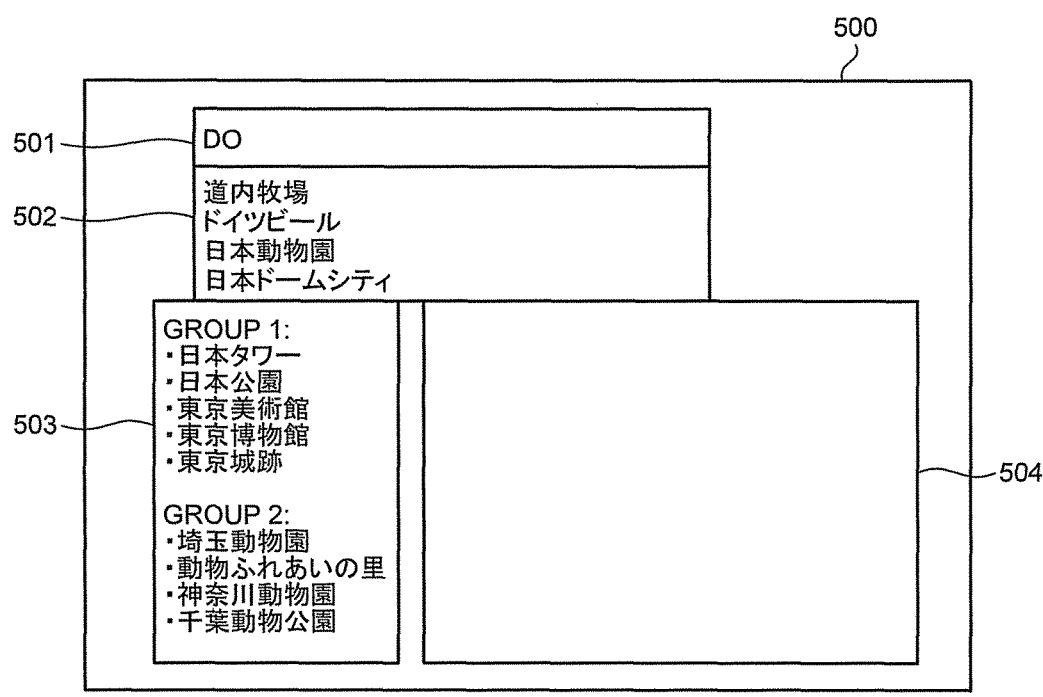
FIG. 10 is a diagram illustrating an example of a search screen where an input string "do" is input.

Next, concrete examples of a first recommended keyword and a second recommended keyword displayed on the search screen 500 will be described using an example screen in FIG. 10. FIG. 10 is a diagram illustrating an example of the search screen 500 displayed on the display device of the user terminal 2 in the case an input string "do" is input.

When an input string "do" is transmitted from the input unit 16 to the first recommended keyword acquisition unit 17, the first recommended keyword acquisition unit 17 performs the series of processes illustrated as the flow chart in FIG. 8, acquires, as first recommended keywords, keyword candidates "道内牧場", "ドイツビール", "日本動物園" and "日本ドームシティ", for example, and transfers the same to the output unit 19. As a result, "道内牧場", "ドイツビール", "日本動物園" and "日本ドームシティ" are displayed as search keywords in a selectable way in the first display area 502 on the search screen 500.

Among the first recommended keywords displayed in the first display area 502, the "readings" 103 in the keyword information 100 illustrated in FIG. 3 of the two first recommended keywords "道内牧場" and "ドイツビール" are "donai bokujo" and "doitsu biiru", respectively, and the recommended keywords are output by the process of step S206 in the flow chart in FIG. 8 since their forward parts coincide with the input string "do" with respect to the "reading" 103. Also, the "readings" 103 in the keyword information 100 illustrated in FIG. 3 of the two first recommended keywords "日本動物園" and "日本ドームシティ" are "nihon dobutsuen" and "nihon domu siti", respectively, and the recommended keywords are output by the process of step S208 in the flow chart in FIG. 8 since they partially coincide with the input string "do" with respect to the "reading" 103.

Furthermore, when "道内牧場", "ドイツビール", "日本動物園" and "日本ドームシティ" are transmitted from the first recommended keyword acquisition unit 17 to the second recommended keyword acquisition unit 18, the second recommended keyword acquisition unit 18 performs the series of processes illustrated as the flow chart in FIG. 9, acquires, as second recommended keywords, five keyword candidates "日本タワー", "日本公園", "東京博物館", "東京博物館" and "東京城跡", which are the keyword candidates in a keyword group related to tourist sites to which the first recommended keywords "日本動物園" and "日本ドームシティ" belong, excluding "日本動物園" and "日本ドームシティ", and transfers the same to the output unit 19, for example. Furthermore, the second recommended keyword acquisition unit 18 acquires, as second recommended keywords, four keyword candidates "埼玉動物園", "動物ふれあいの里", "神奈川動物園", and "千葉動物公園", which are the keyword candidates in a keyword group related to zoos to which the first recommended keyword "日本動物園" belongs, excluding "日本動物園", and transfers the same to the output unit 19, for example. As a result, "日本タワー", "日本公園", "東京博物館", "東京博物館", "東京城跡", "埼玉動物園", "動物ふれあいの里", "神奈川動物園" and "千葉動物公園" are displayed as search keywords in the second display area 503 on the search screen 500 in a selectable way.

Figure 11:
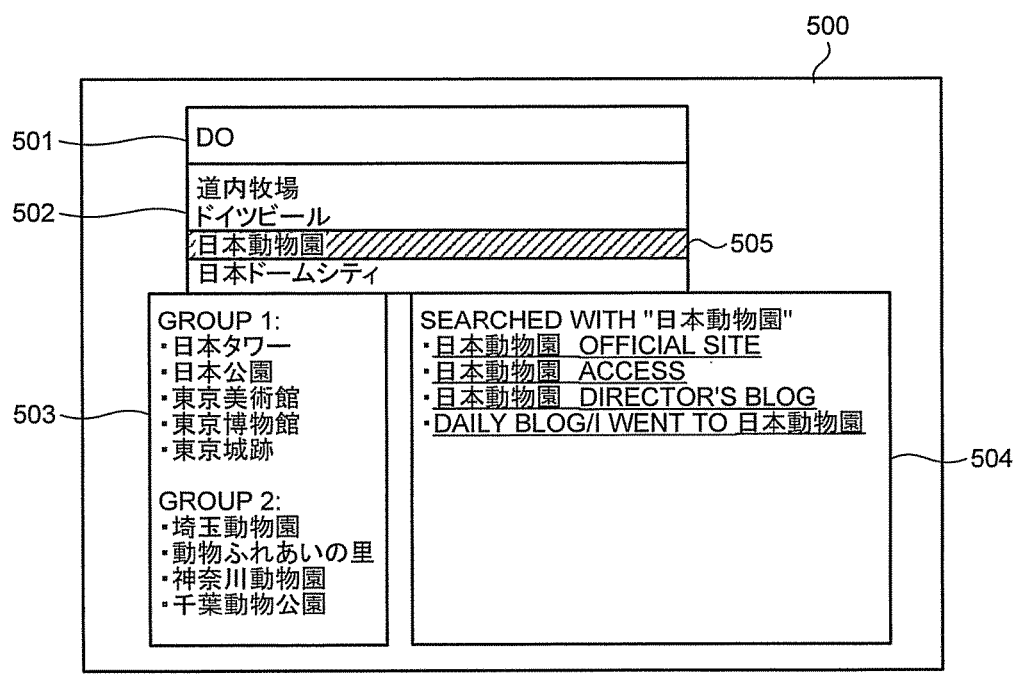
FIG. 11 is a diagram illustrating an example of a search screen where "日本動物園" which is a first recommended keyword is selected.

Next, screen transition at the time of a user selecting a first recommended keyword or a second recommended keyword displayed on the search screen 500 will be described using an example screen in FIG. 11. FIG. 11 illustrates an example screen where "日本動物園", which is a first recommended keyword, is selected on the search screen 500 in FIG. 10. Additionally, various methods are conceivable as an operation method of selecting a first recommended keyword or a second recommended keyword, but here, an explanation will be given citing as an example a method of selecting a first recommended keyword or a second recommended keyword by moving a selected area.

As illustrated in the example screen in FIG. 11, when first recommended keywords are displayed in the first display area 502 and second recommended keywords are displayed in the second display area 503, a selected area 505 that can be moved through the first display area 502 to the second display area 503 is displayed on the search screen 500. A user can move the selected area 505 on the search screen 500 by a drag-and-drop operation by a mouse, for example, to a position where a desired keyword candidate, among the first recommended keywords and the second recommended keywords displayed, is displayed and can select the keyword candidate as a search keyword.

In the example screen in FIG. 11, the selected area 505 is moved to the position of "日本動物園", which is a first recommended keyword, and "日本動物園" is selected as the search keyword. At this time, "日本動物園" is transmitted to the search unit 20 as the search keyword, and a search with "日本動物園" as the search query is performed by the search unit 20, and the search result is displayed in the third display area 504. Here, a list of titles of web pages matching the search keyword "日本動物園" is displayed in the third display area 504 as the search results. The user can select one title from the list of titles displayed in the third display area 504 to thereby view the web page of the selected title. Additionally, in the case a Web browser installed in the user terminal 2 is a common tabbed browser, for example, the web page of the selected title may be viewed by the user under a tab different from the tab where the search screen 500 is displayed. Also, for example, the web page may be viewed by the user being displayed popping up on the search screen 500.

Additionally, even when a search has been performed by the search unit 20 and the search results are displayed in the third display area 504, the display of the first recommended keywords and the second recommended keywords on the search screen 500 is maintained while the input string is not changed. Then, when the user moves the selected area 505 on the search screen 500 and selects another keyword candidate as the search keyword, the keyword candidate that is selected at this time is transmitted to the search unit 20 as a new search keyword, and a search with the newly selected keyword as the search query is performed by the search unit 20, and the search result is displayed in the third display area 504. That is, as long as the input string remains unchanged, the display on the search screen 500 of the first recommended keywords and the second recommended keywords corresponding to the input string is maintained, and a search result obtained with the keyword candidate selected from the first recommended keywords and the second recommended keywords as the search keyword by the movement of the selected area 505 is displayed in the third display area 504 as appropriate.

With the search device 1A of the present embodiment, by displaying the search screen 500 as described above on the display device of the user terminal 2, keyword candidates including thirteen names of tourist spots and zoos "道内牧場", "ドイツビール", "日本動物園", "日本ドームシティ", "日本タワー", "日本公園", "東京美術館", "東京博物館", "東京城跡", "埼玉動物園", "動物ふれあいの里", "神奈川動物園", and "千葉動物公園" can be presented, when one string "do" is input as the input string, to a user considering going to a zoo on a weekend, for example, and thus, the user can access a desired web site from the search results in the third display area 504 simply by selecting a keyword candidate that caught the user's interest and can acquire necessary information. Furthermore, the user can easily perform comparison to decide which zoo to go, for example, by sequentially selecting from a plurality of keyword candidates presented and performing a search. Additionally, web pages in the search results may be opened next to one another and be viewed so as to render the comparison by the user more effective.

Moreover, with the search device 1A of the present embodiment, as illustrated in step S306 in the flow chart in FIG. 9, the order of keyword groups from which second recommended keywords are to be extracted is sorted by the number of first recommended keywords belonging to the keyword groups. Accordingly, for example, as the user proceeds with the input of an input string from "do" to "dobutsu", the first recommended keywords are narrowed down to those including the string "dobutsu (animal)", and also, with respect to keyword groups from which second recommended keywords are to be extracted, keyword groups associated with "dobutsu (animal)" are moved to the top and the second recommended keywords included in the keyword groups associated with "dobutsu (animal)" become more likely to be displayed on the upper part of the second display area 503. In this manner, the search device 1A of the present embodiment enables efficient narrowing down of two pieces of output information by one input.

As described above in detail with concrete examples, the search device 1A of the present embodiment presents to a user, with respect to an input string input by the user, as a search keyword that can be selected, not only the first recommended keywords, which are keyword candidates partially including the input string, but also the second recommended keywords, which are other keyword candidates belonging to the same keyword groups as the first recommended keywords, that is, keyword candidates associated with the first recommended keywords. Accordingly, the user can sequentially select a search keyword from the first recommended keywords and the second recommended keywords presented, without having to repeatedly input the input string, and can perform successive searches a plurality of times by one input, and the operation efficiency is greatly increased. In this manner, according to the search device 1A of the present embodiment, the operation efficiency of the user regarding a search can be significantly increased.

Also, with the search device 1A of the present embodiment, since the first recommended keywords and the second recommended keywords are presented to the user while being dynamically changed according to the change in the input string, the candidates for the search keyword can be efficiently narrowed down, and the operation efficiency of the user regarding a search can be significantly increased.

Second Embodiment

Next, a search device 1B of a second embodiment will be described. The search device 1B of the present embodiment decides the second recommended keywords that are to be displayed on a search screen and their order by using a history of search keywords used for the past searches (search keyword history information). Note that basic structures and the outline of operations of the search device 1B of the present embodiment other than those regarding the characteristics mentioned above are the same as those of the first embodiment. Accordingly, in the following, structures same as those of the first embodiment will be denoted with the same reference numerals and repeated explanation thereof is omitted, and aspects characteristic to the present embodiment will be mainly described.

Figure 12:
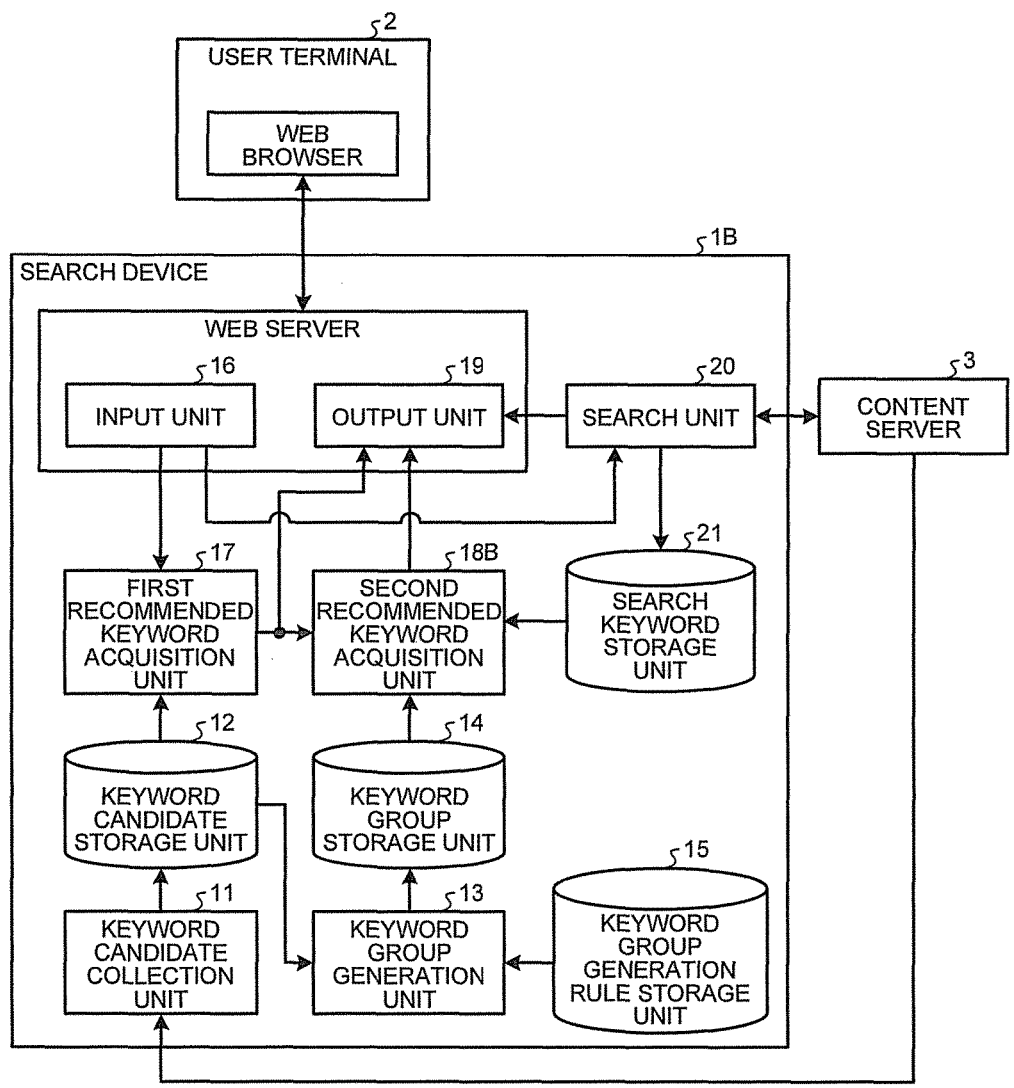
FIG. 12 is a block diagram illustrating a functional configuration of a search device of a second embodiment.

FIG. 12 is a block diagram illustrating a functional configuration of the search device 1B of the second embodiment. As illustrated in FIG. 12, the search device 1B of the present embodiment further includes, in addition to the structures of the search device 1A of the first embodiment illustrated in FIG. 2, a search keyword storage unit 21. Also, the search device 1B of the present embodiment includes, instead of the second recommended keyword acquisition unit 18 included in the search device 1A of the first embodiment, a second recommended keyword acquisition unit 18B.

The search keyword storage unit 21 holds search keyword history information indicating the history of search keywords used in the past search processes by the search unit 20.

FIG. 13 is a diagram illustrating an example of the search keyword history information held in the search keyword storage unit 21. Search keyword history information 600 illustrated in FIG. 13 includes a "search ID" 601 for identifying a search process, a "user ID" 602 for identifying a user who has requested the search, a "search execution time" 603 indicating the time of performing the search process, a "search keyword" 604 used in the search, and a "keyword ID" 605 for identifying the search keyword. Additionally, the search keyword history information 600 contains, in one line, information about one search keyword in one search process. One "search ID" 601 is assigned to one search process, and histories with the same "search IDs" 601 are held, on a per-search-keyword basis, for a plurality of search keywords input for one search.

The search keyword storage unit 21 may be realized by the same storage device as the keyword candidate storage unit 12, the keyword group storage unit 14 and the keyword group generation rule storage unit 15, or may be realized by a separate storage device. The storage device is a hard disk or flash memory, for example.

Like the second recommended keyword acquisition unit 18 of the first embodiment, the second recommended keyword acquisition unit 18B acquires as a second recommended keyword, and transmits to the output unit 19, a keyword candidate which is other than a first recommended keyword and which is included in a keyword group satisfying a predetermined output condition, among keyword groups to which the first recommended keyword acquired by the first recommended keyword acquisition unit 17 belongs. However, in the present embodiment, history of search keywords used in the past search processes is reflected in the output condition for a keyword group. That is, at the time of deciding second recommended keywords to be displayed on a search screen and their order, the second recommended keyword acquisition unit 18B of the present embodiment refers to the search keyword history information held in the search keyword storage unit 21 and decides second recommended keywords to be displayed on a search screen and their order in such a way that a keyword candidate included in a keyword group including a search keyword used in an immediately preceding search process or a keyword candidate included in a keyword group including a larger number of search keywords used in the past search processes is more likely to be selected as the second recommended keyword, and is at a higher position in the order of display.

Figure 14:
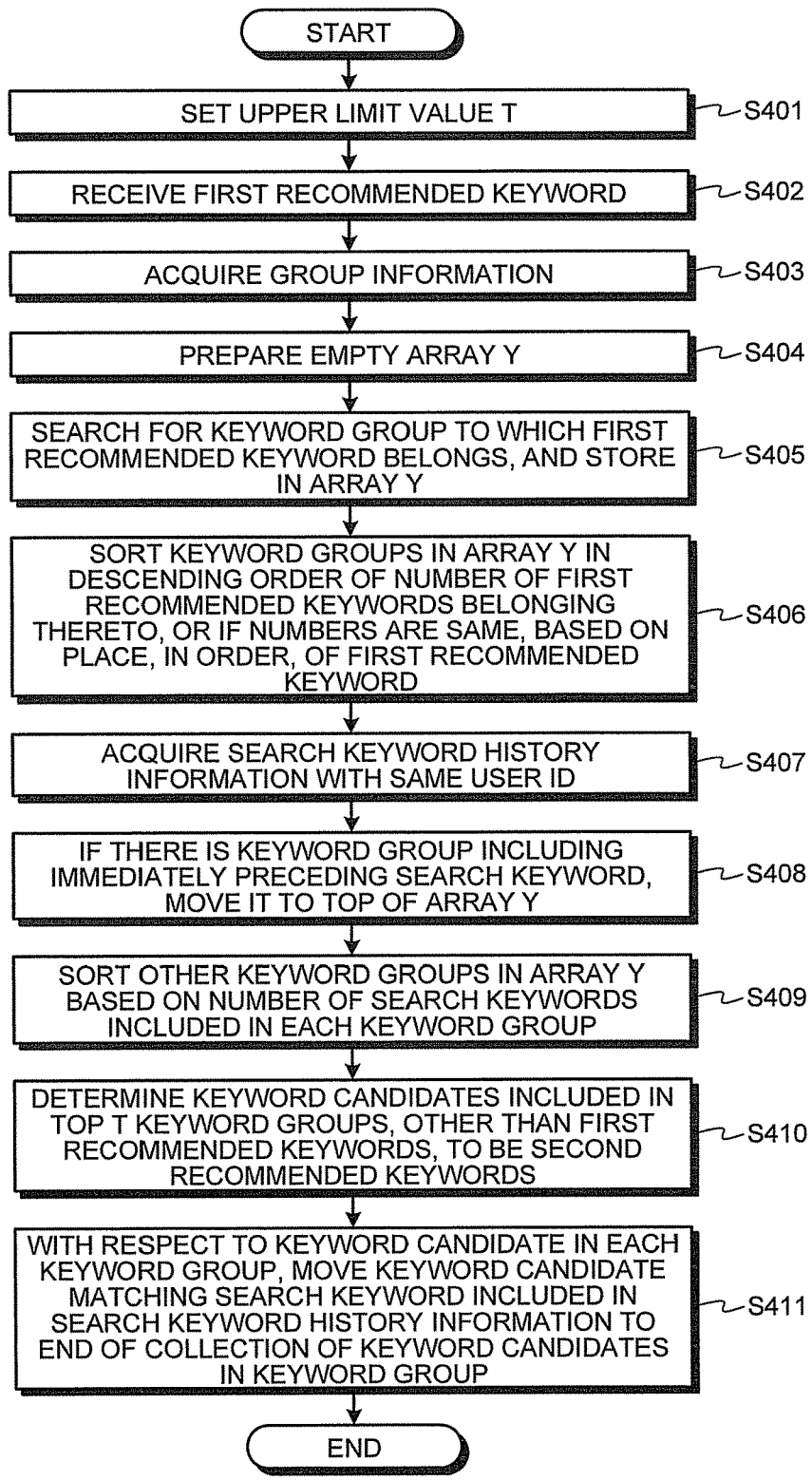
FIG. 14 is flow chart illustrating an example of processing of a second recommended keyword acquisition unit of the second embodiment.

Now, a concrete example of processing of the second recommended keyword acquisition unit 18B of the present embodiment will be described using FIG. 14. FIG. 14 is a flow chart illustrating an example of processing of the second recommended keyword acquisition unit 18B. The series of processes illustrated as the flow chart in FIG. 14 is repeatedly performed every time the first recommended keyword is changed. Moreover, the processes of steps S401 to S406 in the flow chart in FIG. 14 are the same as the processes of steps S301 to S306 in the flow chart in FIG. 9, and explanation thereof is omitted.

After sorting in the descending order, in step S406, keyword groups to which a first recommended keyword belongs, the second recommended keyword acquisition unit 18B then acquires, from the search keyword storage unit 21, search keyword history information with the same user ID as the user who is inputting a string (step S407). The range of search keyword history information to be acquired may include every search keyword history information with the same user ID, or it may be narrowed down to a predetermined period of time based on the "search execution time" 603. Additionally, the user ID of a user inputting a string can be acquired by performing a known user authentication process at the time of access to the search device 1B and making the user input the user ID in the user authentication process, for example.

Next, if a keyword group including a search keyword with the latest search keyword history information, among pieces of search keyword history information acquired in step S407, that is, a keyword group including a search keyword which the user has specified in the immediately preceding search process, is in the array Y, the second recommended keyword acquisition unit 18B moves the keyword group to the top of the array Y (step S408). At this time, in the case there is a plurality of keyword groups including the immediately preceding search keyword, all of the keyword groups are sequentially moved to the top of the array Y. Also, the second recommended keyword acquisition unit 18B checks, for each of the keyword groups that were not moved in step S408, how many search keywords included in the search keyword history information acquired in step S407 are included, that is, the number of search keywords, in the keyword group, used in the past search processes, and sorts the keyword groups in the descending order of the number of search keywords (step S409). By the processes of steps S408 and S409 described above, the keyword groups in the array Y are sorted in the order of (1) a keyword group including a search keyword that the user has specified in the immediately preceding search process, (2) a keyword group including a larger number of search keywords that the user has specified in the past search processes.

Next, the second recommended keyword acquisition unit 18B extracts, based on the upper limit value T set in step S401, maximum T keyword groups from the top of the array Y, and determines keyword candidates included in these keyword groups, other than the first recommended keywords, to be the second recommended keywords (step S410). At this time, if there is a keyword candidate, included in the T keyword groups, that matches a search keyword included in the search keyword history information with the user ID of the user, the second recommended keyword acquisition unit 18B moves the keyword candidate to the end in the collection of keyword candidates in the keyword group (step S411). With the process of step S411, a keyword candidate not specified as a search keyword by the user in the past search processes is displayed at a higher position.

As described above, according to the search device 1B of the present embodiment, keyword candidates to be presented as the second recommended keywords and their order are decided using the history of search keywords that a user has specified in the past search processes, and thus, keyword candidates that are in accordance with the intention of the user regarding the series of searches can be efficiently presented as the second recommended keywords. In this manner, according to the search device 1B of the present embodiment, an operation efficiency of the user regarding a search can be significantly increased.

Third Embodiment

Next, a search device 1C of a third embodiment will be described. The search device 10 of the present embodiment preferentially displays as a first recommended keyword, on a search screen, a keyword candidate included in a keyword group to which a search keyword that a user has specified in the immediately preceding search process belongs, the keyword candidate being other than the search keyword. Note that basic structures and the outline of operations of the search device 10 of the present embodiment other than those regarding the characteristics mentioned above are the same as those of the first and second embodiments. Accordingly, in the following, structures same as those of the first and second embodiments will be denoted with the same reference numerals and repeated explanation thereof is omitted, and aspects characteristic to the present embodiment will be mainly described.

Figure 15:
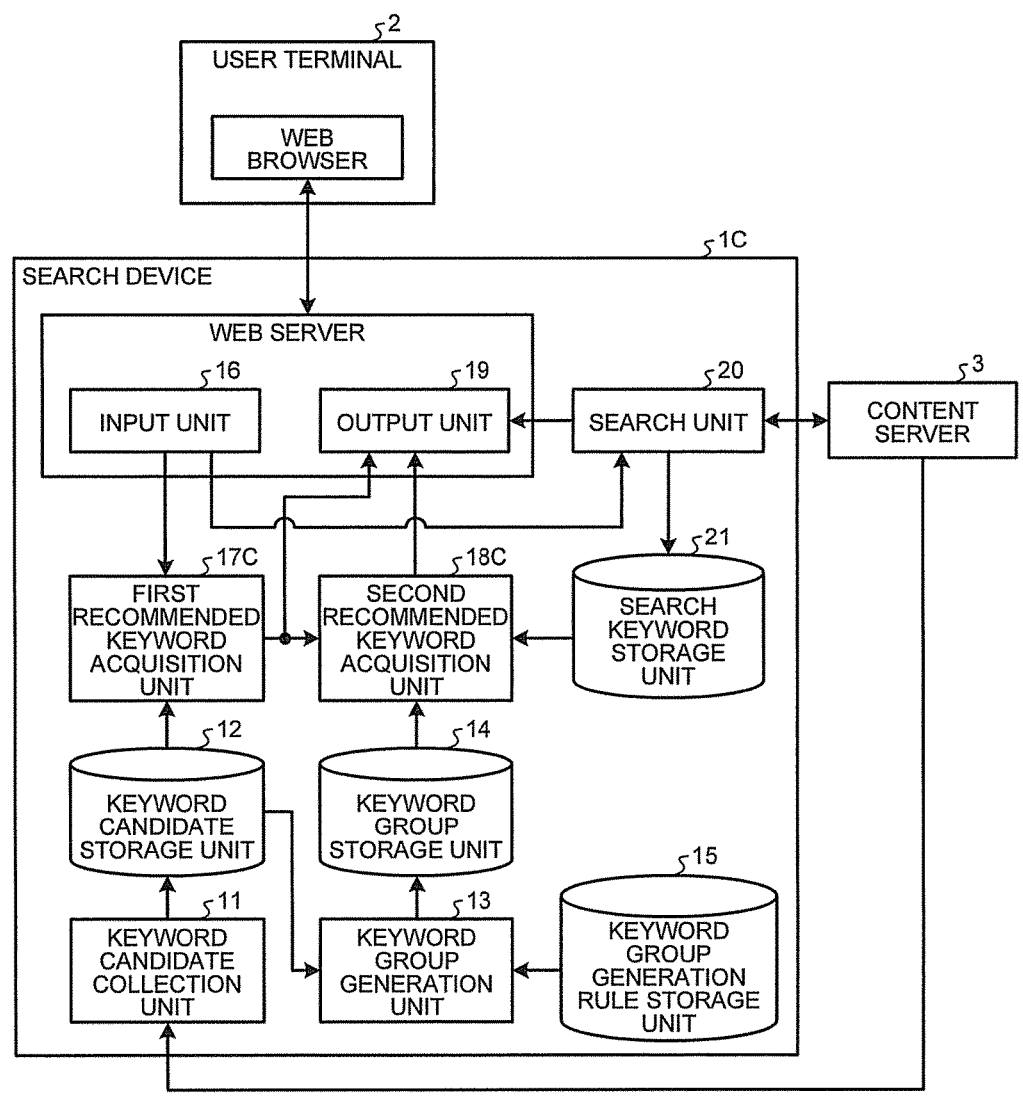
FIG. 15 is a block diagram illustrating a functional configuration of a search device of a third embodiment.

FIG. 15 is a block diagram illustrating a functional configuration of the search device 10 of the third embodiment. Like the search device 1B of the second embodiment, the search device 10 of the present embodiment includes the search keyword storage unit 21 holding search keyword history information. Also, instead of the first recommended keyword acquisition unit 17 and the second recommended keyword acquisition unit 18 included in the search device 1A of the first embodiment, the search device 10 of the present embodiment includes a first recommended keyword acquisition unit 17C and a second recommended keyword acquisition unit 18C.

In addition to the function of the second recommended keyword acquisition unit 18 of the first embodiment or the second recommended keyword acquisition unit 18B of the second embodiment, the second recommended keyword acquisition unit 18C includes a function of identifying, by referring to the search keyword history information held in the search keyword storage unit 21 and the group information held in the keyword group storage unit 14, a keyword group to which a search keyword that a user has specified in the immediately preceding search process belongs, and transferring the group information of the keyword group to the first recommended keyword acquisition unit 17C.

The first recommended keyword acquisition unit 17C receives the group information of the keyword group to which the search keyword that the user has specified in the immediately preceding search process belongs, from the second recommended keyword acquisition unit 18C. Then, in a state where an input string is not input in an input form on the search screen, the first recommended keyword acquisition unit 17C acquires, as a first recommended keyword, a keyword candidate which is included in the keyword group to which the search keyword used in the immediately preceding search belongs and which is other than the search keyword used in the immediately preceding search. That is, the first recommended keyword acquisition unit 17C receives an input string from the input unit 16 every time the input string is changed, but when the input string received from the input unit 16 indicates a blank (empty), the first recommended keyword acquisition unit 17C refers to the group information received from the second recommended keyword acquisition unit 18C and transfers to the output unit 19, as a first recommended keyword, a keyword candidate, among keyword candidates included in the keyword group indicated by the group information, other than the search keyword used in the immediately preceding search.

Also, like the first recommended keyword acquisition unit 17 of the first embodiment, when an input string is input in an input form on the search screen, the first recommended keyword acquisition unit 17C checks the input string received from the input unit 16 and the keyword information held in the keyword candidate storage unit 12 against each other, and acquires a keyword candidate satisfying a predetermined output condition, among the keyword candidates stored in the keyword candidate storage unit 12, as a first recommended keyword. Moreover, in the present embodiment, the group information of the keyword group to which the search keyword used in the immediately preceding search process belongs is reflected in the output condition for the first recommended keyword. That is, the first recommended keyword acquisition unit 17C of the present embodiment preferentially acquires, as a first recommended keyword, a keyword candidate included in the keyword group to which the search keyword used in the immediately preceding process belongs, among keyword candidates partially including the input string.

Figure 16:
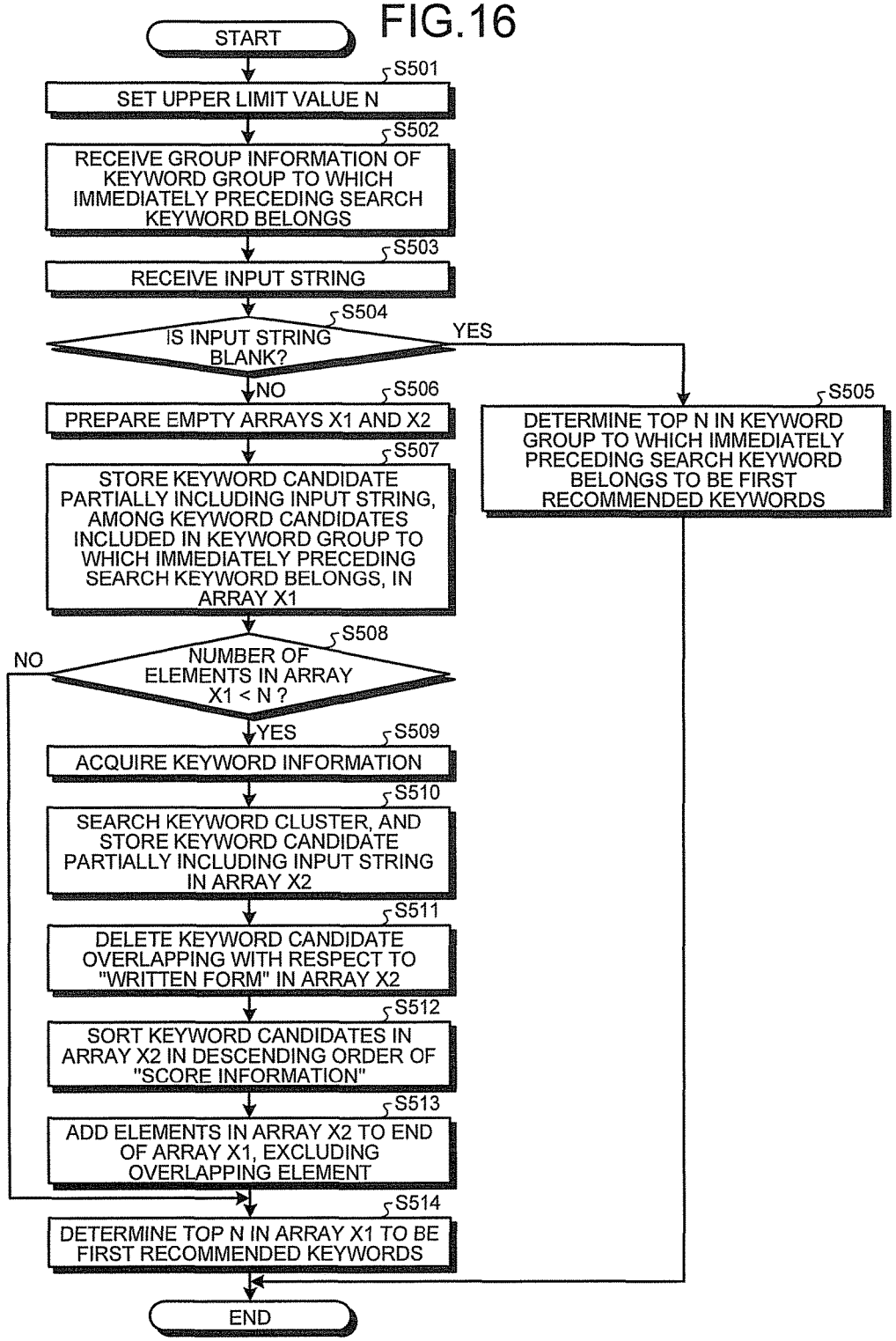
FIG. 16 is a flow chart illustrating an example of processing of a first recommended keyword acquisition unit of the third embodiment.

A concrete example of processing of the first recommended keyword acquisition unit 17C of the present embodiment is now described using FIG. 16. FIG. 16 is a flow chart illustrating an example of processing of the first recommended keyword acquisition unit 17C. The series of processes illustrated as the flow chart in FIG. 16 is repeatedly performed every time an input string is changed.

The first recommended keyword acquisition unit 17C first sets an upper limit value N (for example, N=4) for the number of first recommended keywords (step S501). Then, the first recommended keyword acquisition unit 17C receives group information indicating the keyword group to which the immediately preceding search keyword belongs, from the second recommended keyword acquisition unit 18C (step S502). Also, the first recommended keyword acquisition unit 17C receives an input string from the input unit 16 (step S503).

Next, the first recommended keyword acquisition unit 17C determines whether the input string received in step S503 is a blank (empty) or not (step S504). If the input string is blank (step S504: Yes), the first recommended keyword acquisition unit 17C determines the top N keyword candidates, among the keyword candidates included in the keyword group indicated by the group information received in step S502, other than the keyword candidate used as the immediately preceding search keyword, to be the first recommended keywords (step S505), transfers the first recommended keywords to the second recommended keyword acquisition unit 18C and the output unit 19, and ends the series of processes. Additionally, the order of the keyword candidates can be set such that the position will be higher as the value of the "score information" 106 in the keyword information 100 illustrated in FIG. 3 is greater, for example.

In the case it is determined as a result of step S504 that the input string is not blank (step S504: No), the first recommended keyword acquisition unit 17C prepares empty arrays X1 and X2 for temporarily holding the keyword candidates (step S506). Then, the first recommended keyword acquisition unit 17C performs a search on the keyword group indicated by the group information received in step S502 under the four conditions described in the first embodiment (steps S205 to S208 in FIG. 8), and sequentially stores keyword candidates partially including the input string acquired in step S503 in the array X1 (step S507).

Next, the first recommended keyword acquisition unit 17C determines whether or not the number of elements in the array X1 is less than the upper limit value N set in step S501 (step S508). In the case it is determined as a result of step S508 that the number of elements in the array X1 is N or more (step S508: No), the process proceeds to step S514. On the other hand, in the case the number of elements in the array X1 is less than N (step S508: Yes), the first recommended keyword acquisition unit 17C acquires the keyword information held in the keyword candidate storage unit 12 (step S509), performs the search using the four conditions described in the first embodiment (steps S205 to S208 in FIG. 8) on the keyword cluster indicated by the acquired keyword group, and sequentially stores keyword candidates partially including the input string acquired in step S503 in the array X2 (step S510).

Next, in the case there are a plurality of keywords that overlap one another with respect to the "written expression" 102 in the keyword information 100 illustrated in FIG. 3 in the keyword candidates stored in the array X2, the first recommended keyword acquisition unit 17C deletes the second and the following keyword candidates (step S511). Then, the first recommended keyword acquisition unit 17C sorts the keyword candidates in the array X2 in the descending order of the values of the "score information" 106 in the keyword information 100 illustrated in FIG. 3 (step S512).

Then, the first recommended keyword acquisition unit 17C adds the elements in the array X2, other than the overlapping elements, to the end of the array X1 (step S513). Then, the first recommended keyword acquisition unit 17C determines, based on the upper limit value N set in step S201, maximum N keyword candidates from the top of the array X1 as the first recommended keywords (step S514), transfers the first recommended keywords to the second recommended keyword acquisition unit 18C and the output unit 19, and ends the series of processes.

Next, a concrete example of an operation of the search device 10 of the present embodiment will be described using example screens in FIGS. 17A and 17B. A search screen 510 illustrated in FIG. 17A is an example screen after a user has selected on the search screen 500 illustrated in FIG. 11, as a search keyword, "埼玉動物園", which is a second recommended keyword displayed in the second display area 503 and issued a search request, and then deleted the input string in the input form 501. Also, a search screen 520 illustrated in FIG. 17B is an example screen after the user has input a string "sa" in the input form 501 on the search screen 510 illustrated in FIG. 17A.

When a search is performed with "埼玉動物園" as the search keyword and then the input string in the input form 501 is deleted, the first recommended keyword acquisition unit 17C acquires, as the first recommended keywords, the top four keyword candidates included in the keyword group to which the immediately preceding search keyword "埼玉動物園" belongs, excluding "埼玉動物園", that is, four keyword candidates "日本動物園", "動物ふれあいの里", "神奈川動物園" and "佐渡動物公園", and outputs the same to the output unit 19. As a result, as illustrated in FIG. 17A, "日本動物園", "動物ふれあいの里", "神奈川動物園" and "佐渡動物公園" are displayed in the first display area 502 on the search screen 510, being selectable as the next search keyword.

When the user inputs an input string "sa" in the input form 501 in this state, the first recommended keyword acquisition unit 17C performs a process of preferentially acquiring a first recommended keyword which is a keyword candidate partially including the input string "sa" from the keyword candidates included in the keyword group to which "埼玉動物園" belongs. Here, the first recommended keyword acquisition unit 170 first acquires, as the first recommended keywords, three keyword candidates "佐渡動物公園" (sado dobutsu kouen) "名古屋サファリパーク (nagoya safari paaku)" and "富士見サファリパーク (fujimi safari paaku)" included in the keyword group to which "埼玉動物園" belongs and then acquires, from keyword candidates which are not included in the keyword group to which "埼玉動物園" belongs and whose forward parts coincide with the input string "sa" with respect to the "written expression" 102, "サッカー (sakka)" as the first recommended keyword, and transfers these first recommended keywords to the output unit 19. As a result, as illustrated in FIG. 17(b), 佐渡動物公園", "名古屋サファリパーク", "富士見サファリパーク" and "サッカー" are displayed in a first display area 502 on the search screen 520, being selectable as the next search keyword.

As described above, with the search device 10 of the present embodiment, an operation of narrowing down the candidates for a search keyword particularly in a keyword group with a large number of belonging keyword candidates can be simplified by preferentially acquiring, as the first recommended keyword, a keyword candidate included in a keyword group to which the immediately preceding search keyword belongs. For example, since a large number of keyword candidates belong to a keyword group related to "動物園", if all the keyword candidates are displayed on the search screen at the same time, the visibility is greatly reduced and the operation of selecting a desired keyword candidate on the search screen is complicated. In such a case, the search device 10 of the present embodiment can, with respect to a keyword group to which a large number of keyword candidates belong, such as the keyword group related to "動物園", for example, narrow down the keyword candidates according to the input of an input string and present them to a user as the first recommended keywords, and the operation efficiency of the user can be further increased.

As described above, according to the search device 10 of the present embodiment, since keyword candidates included in the keyword group to which the immediately preceding search keyword belongs are preferentially displayed on the search screen as the first recommended keywords, taking into account the immediately preceding search operation of a user, appropriate keywords may be presented to the user in accordance with an input string in successive search operations. Also, with a keyword group to which a large number of keyword candidates belong, the keyword candidates can be narrowed down according to the input of an input string and be presented to the user. Accordingly, the search device 10 of the present embodiment can greatly increase the operation efficiency of the user regarding a search.

Fourth Embodiment

Next, a search device 1D of a fourth embodiment will be described. The search device 1D of the present embodiment acquires and displays a second recommended keyword at a stage where the input of an input string has progressed and the number of first recommended keywords has been narrowed down. Additionally, basic structures and the outline of operations of the search device 1D of the present embodiment other than those regarding the characteristics mentioned above are the same as those of the first embodiment. Note that, in the following, structures same as those of the first embodiment will be denoted with the same reference numerals and repeated explanation thereof is omitted, and aspects characteristic to the present embodiment will be mainly described.

Figure 18:
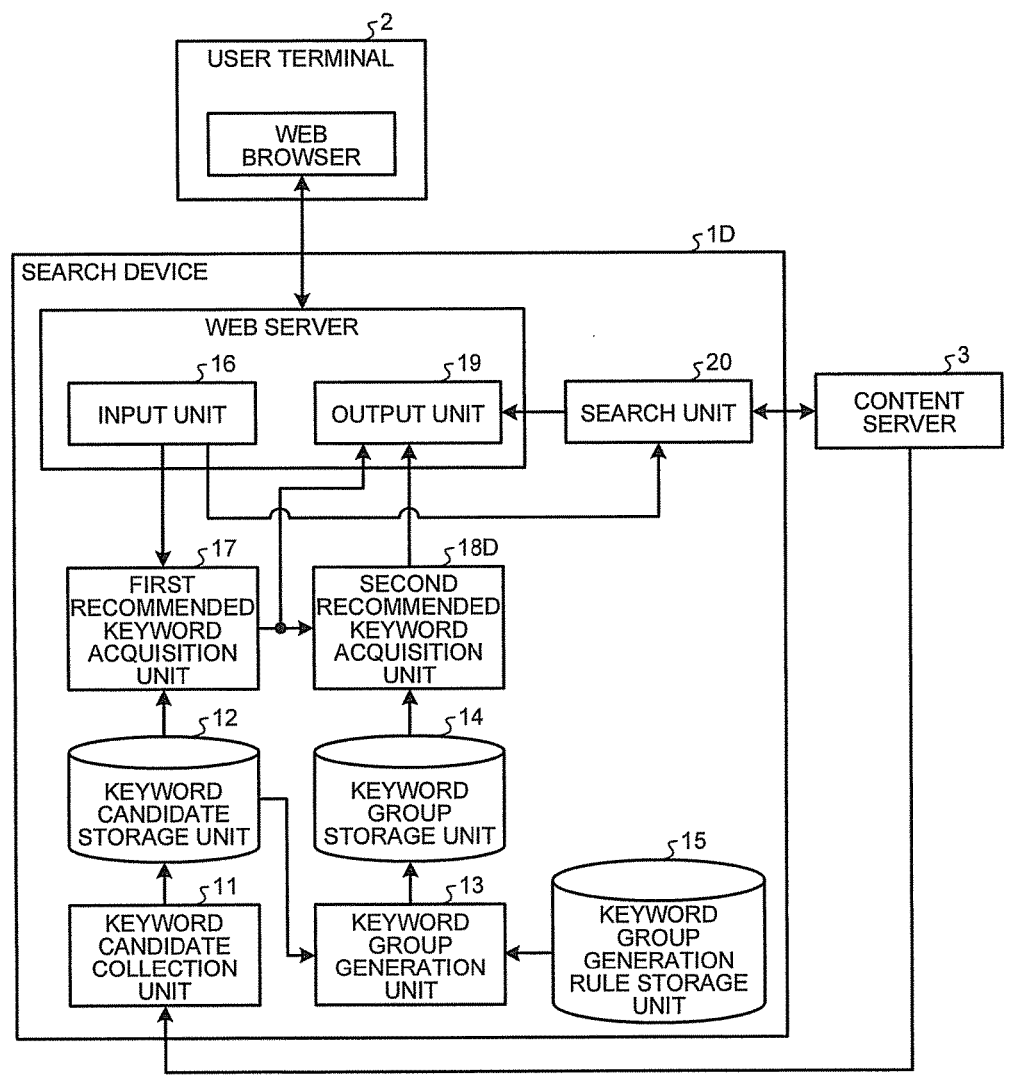
FIG. 18 is a block diagram illustrating a functional configuration of a search device of a fourth embodiment.

FIG. 18 is a block diagram illustrating a functional configuration of the search device 1D of the fourth embodiment. As illustrated in FIG. 18, the search device 1D of the present embodiment includes a second recommended keyword acquisition unit 18D, instead of the second recommended keyword acquisition unit 18 included in the search device 1A of the first embodiment.

When first recommended keywords are received from the first recommended keyword acquisition unit 17, the second recommended keyword acquisition unit 18D compares the number of received first recommended keywords with a predetermined value set in advance. Then, if the number of first recommended keywords is equal to or less than the predetermined value, second recommended keywords which are included in the keyword groups to which the first recommended keywords belong and which are keyword candidates other than the first recommended keywords are acquired.

Figure 19:
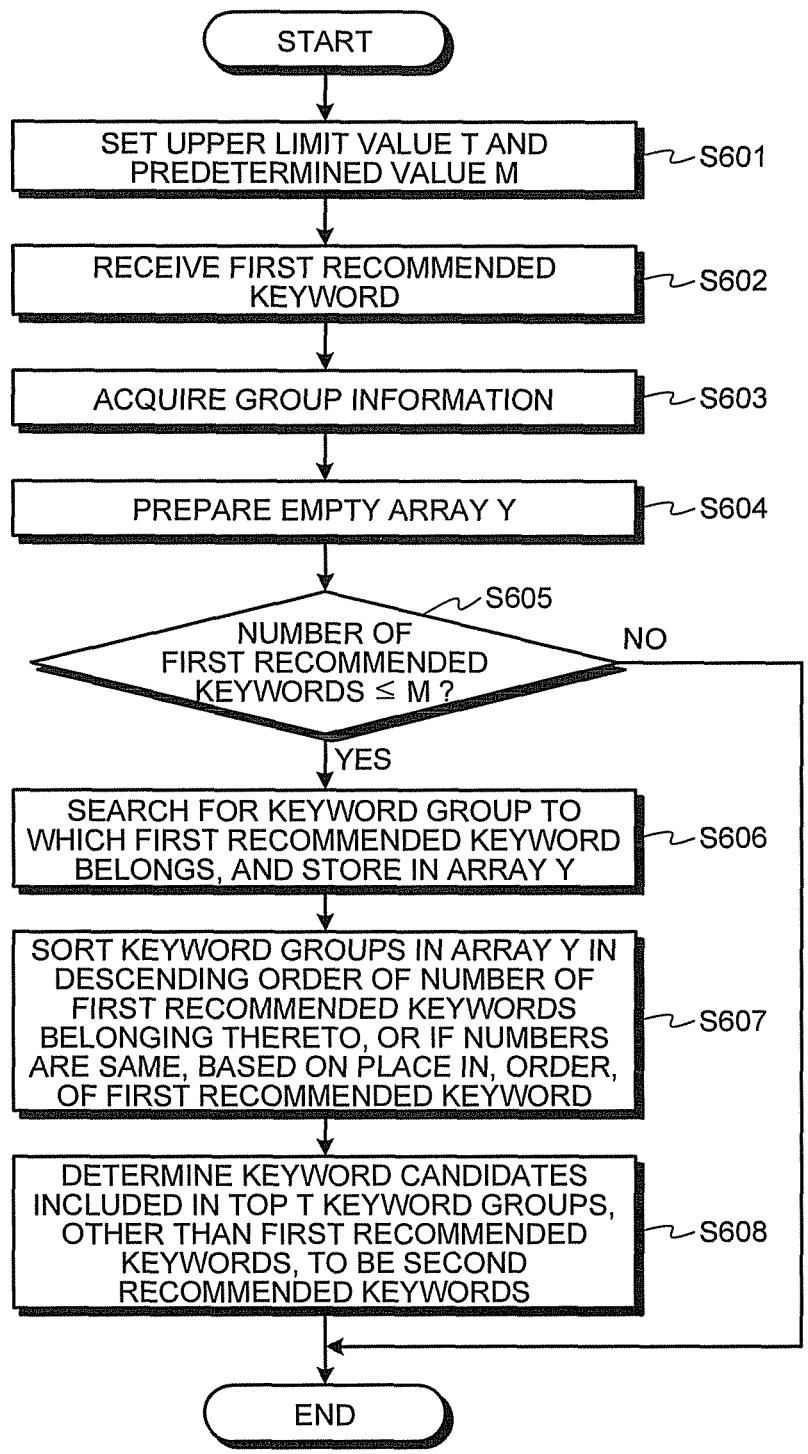
FIG. 19 is a flow chart illustrating an example of processing of a second recommended keyword acquisition unit of the fourth embodiment.

FIG. 19 is a flow chart illustrating an example of processing of the second recommended keyword acquisition unit 18D. The series of processes illustrated as the flow chart in FIG. 19 is repeatedly performed every time the first recommended keyword is changed.

The second recommended keyword acquisition unit 18D first sets an upper limit value T (for example, T=3) for the number of keyword groups, and sets a predetermined value M (for example, M=3) defining the timing of acquiring a second recommended keyword (step S601). Next, the second recommended keyword acquisition unit 18D receives a first recommended keyword from the first recommended keyword acquisition unit 17 (step S602). Then, the second recommended keyword acquisition unit 18D acquires the group information held in the keyword group storage unit 14 (step S603). Furthermore, the second recommended keyword acquisition unit 18D prepares an empty array Y for temporarily holding a keyword group (step S604).

Next, the second recommended keyword acquisition unit 18D compares the number of first recommended keywords acquired in step S602 with the predetermined value M set in step S601, and determines whether or not the number of first recommended keywords is equal to or less than the predetermined value M (step S605). Then, if the number of first recommended keywords is exceeding the predetermined value M (step S605: No), the process is ended.

On the other hand, if the number of first recommended keywords is equal to or less than the predetermined value M (step S605: Yes), the second recommended keyword acquisition unit 18D acquires the second recommended keyword, in the same manner as the second recommended keyword acquisition unit 18 of the first embodiment. That is, the second recommended keyword acquisition unit 18D searches for a keyword group to which the first recommended keyword received in step S602 belongs, using the group information acquired in step S603, and stores the obtained keyword group in the array Y (step S606). Then, when the search is completed for all the keyword groups, the second recommended keyword acquisition unit 18D sorts the keyword groups stored in the array Y in the descending order of the number of first recommended keywords belonging to the keyword group (step S607). Lastly, the second recommended keyword acquisition unit 18D extracts, based on the upper limit value T set in step S601, maximum T keyword groups from the top of the array Y, determines the keyword candidates, other than the first recommended keywords, included in these keyword groups to be the second recommended keywords (step S608), transfers the second recommended keywords to the output unit 19, and ends the series of processes.

Next, a concrete example of an operation of the search device 1D of the present embodiment will be described using example screens in FIGS. 20A and 20B. A search screen 530 illustrated in FIG. 20A is an example screen after a user has input a string "do" in an input form 501. Also, a search screen 540 illustrated in FIG. 20B is an example screen after the user has progressed with the input of the string and has input an input string "dobutsu" in the input form 501. Additionally, as described above, with the search device 1D of the present embodiment, the second recommended keyword acquisition unit 18D sets in advance the predetermined value M, which acts as a threshold for the number of first recommended keywords. Here, an explanation is given assuming that the predetermined value M is set to "3".

When the user inputs a string "do" in the input form 501, the input string "do" is transmitted from the input unit 16 to the first recommended keyword acquisition unit 17. When the input string "do" is received, the first recommended keyword acquisition unit 17 acquires, as the first recommended keywords corresponding to the input string "do", each of keyword candidates "道内牧場 (donai bokujo)", "ドイツビール (doitsu biiru)", "日本動物園 (nihon dobutsuen)" and "日本ドームシティ (nihon domu siti)", for example, and transfers the same to the output unit 19 and the second recommended keyword acquisition unit 18D. As a result, "道内牧場", "ドイツビール", "日本動物園" and "日本ドームシティ" are displayed in a first display area 502 on the search screen 530 in a selectable way, as illustrated in FIG. 20(a). Moreover, at this time, since the number of first recommended keywords is greater than the predetermined value M, three, the second recommended keyword acquisition unit 18D does not perform acquisition of second recommended keywords. Thus, a second recommended keyword is not displayed in the second display area 503.

Then, when the user progresses with the input of the string and a string "dobutsu" is input in the input form 501, the input string "dobutsu" is transmitted from the input unit 16 to the first recommended keyword acquisition unit 17. When the input string "dobutsu" is received, the first recommended keyword acquisition unit 17 acquires, as the first recommended keywords corresponding to the input string "dobutsu", two keyword candidates "日本動物園 (nihon dobutsuen)" and "北海道動物園 (hokkaido dobutsuen)", for example, and transfers the keyword candidates to the output unit 19 and the second recommended keyword acquisition unit 18D. As a result, "日本動物園" and "北海道動物園" are displayed in a first display area 502 on the search screen 540 in a selectable way, as illustrated in FIG. 20(b).

Also, at this time, since the number of first recommended keywords is equal to or less than the predetermined value M, three, the second recommended keyword acquisition unit 18D performs acquisition of second recommended keywords, acquires, as the second recommended keywords, each of keyword candidates "埼玉動物園", "動物ふれあいの里", "神奈川動物園" and "千葉動物公園" in the keyword group related to "動物園 (zoo)", other than the first recommended keywords "日本動物園" and "北海道動物園", for example, and transfers the same to the output unit 19. As a result, "埼玉動物園", "動物ふれあいの里", "神奈川動物園" and "千葉動物公園" are displayed in the second display area 503 on the search screen 540 in a selectable way, as illustrated in FIG. 20(*b*).

As described above, with the search device 1D of the present embodiment, the second recommended keyword is first displayed when the first recommended keywords have been narrowed down according to the progress of the input of an input string, and thus, an operation of selecting a search keyword on a search screen can be simplified by displaying only the second recommended keywords better suiting the intention of the user. For example, when the user inputs a string "do" in the input form 501 to obtain information about a zoo, the search screen 500 of the first embodiment illustrated in FIG. 10 displays keyword candidates in a keyword group, related to tourist sites, to which keywords "日本動物園 (nihon dobutsuen)" and "日本ドームシティ (nihon domu siti)" belong at the top of the second display area 503 as the second recommended keywords, and the display is complicated. In contrast, the search device 1D of the present embodiment is capable of preferentially displaying, at the stage where the input of an input string has progressed and it has become clear that the intention of the user is related to "dobutsu (animal)", keyword candidates in a keyword group related to "dobutsuen (zoo)" in the second display area 503. By displaying, in this manner, only the second recommended keywords better suiting the intention of the user, an operation of selecting a search keyword on a search screen can be simplified.

As described above, according to the search device 1D of the present embodiment, since the second recommended keyword is displayed only when the input of an input string has progressed and the first recommended keywords have been narrowed down, an operation of selecting a search keyword on a search screen can be simplified. Accordingly, with the search device 1D of the present embodiment, an operation efficiency of a user regarding a search can be significantly increased.

Fifth Embodiment

Next, a search device 1E of a fifth embodiment will be described. The search device 1E of the present embodiment performs acquisition of second recommended keywords from not only the keyword group to which a first recommended keyword belongs, but also from a keyword group determined in advance as a keyword group relevant to the first recommended keyword. Note that basic structures and the outline of operations of the search device 1E of the present embodiment other than those regarding the characteristics mentioned above are the same as those of the first embodiment. Accordingly, in the following, structures same as those of the first embodiment will be denoted with the same reference numerals and repeated explanation thereof is omitted, and aspects characteristic to the present embodiment will be mainly described.

Figure 21:
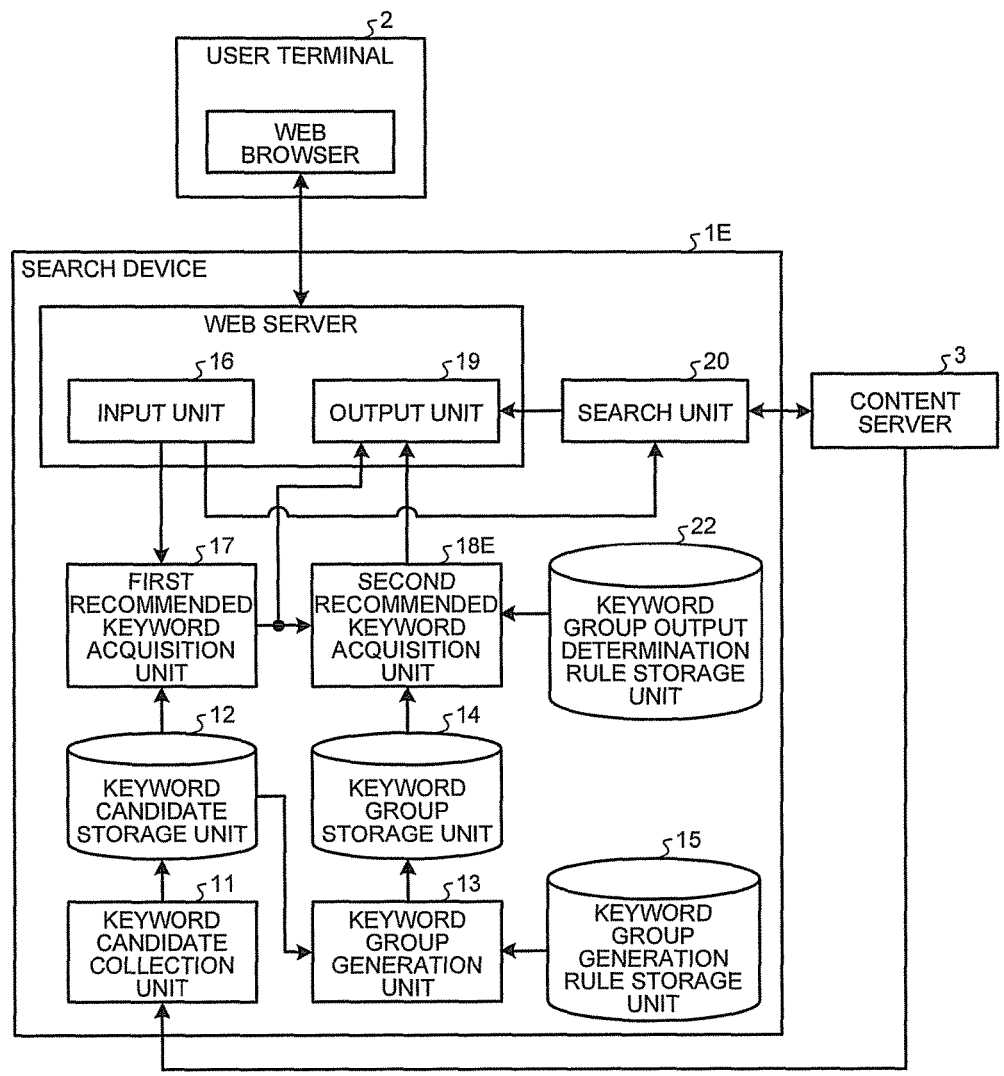
FIG. 21 is a block diagram illustrating a functional configuration of a search device of a fifth embodiment.

FIG. 21 is a block diagram illustrating a functional configuration of the search device 1E of the fifth embodiment. As illustrated in FIG. 21, the search device 1E of the present embodiment further includes, in addition to the structures of the search device 1A of the first embodiment illustrated in FIG. 2, a keyword group output determination rule storage unit 22. Also, the search device 1E of the present embodiment includes a second recommended keyword acquisition unit 18E, instead of the second recommended keyword acquisition unit 18 included in the search device 1A of the first embodiment.

The keyword group output determination rule storage unit 22 holds a keyword group output determination rule indicating a correspondence relationship between a predetermined keyword candidate and a keyword group which is a keyword group to which the keyword candidate does not belong, but which is relevant to the keyword candidate.

FIG. 22 is a diagram illustrating an example of the keyword group output determination rule held in the keyword group output determination rule storage unit 22. A keyword group output determination rule 700 illustrated in FIG. 22 includes a "keyword written expression" 701 indicating the written expression of a target keyword candidate, a "group ID" 702 for identifying a keyword group relevant to the keyword candidate, and a "group name" 703, which is a name characterizing the keyword group. The "group name" 703 may be manually attached to a target keyword group, or may be acquired from a specific document or dictionary data, in combination with the keyword group.

Additionally, the keyword group output determination rule storage unit 22 may be realized by the same storage device as the keyword candidate storage unit 12, the keyword group storage unit 14 and the keyword group generation rule storage unit 15, or may be realized by a separate storage device. The storage device is a hard disk or flash memory, for example.

The second recommended keyword acquisition unit 18E acquires second recommended keywords not only from the keyword group to which a first recommended keyword acquired by the first recommended keyword acquisition unit 17 belongs, but also from a keyword group indicated by the keyword group output determination rule to be a keyword group relevant to the first recommended keyword acquired by the first recommended keyword acquisition unit 17.

Figure 23:
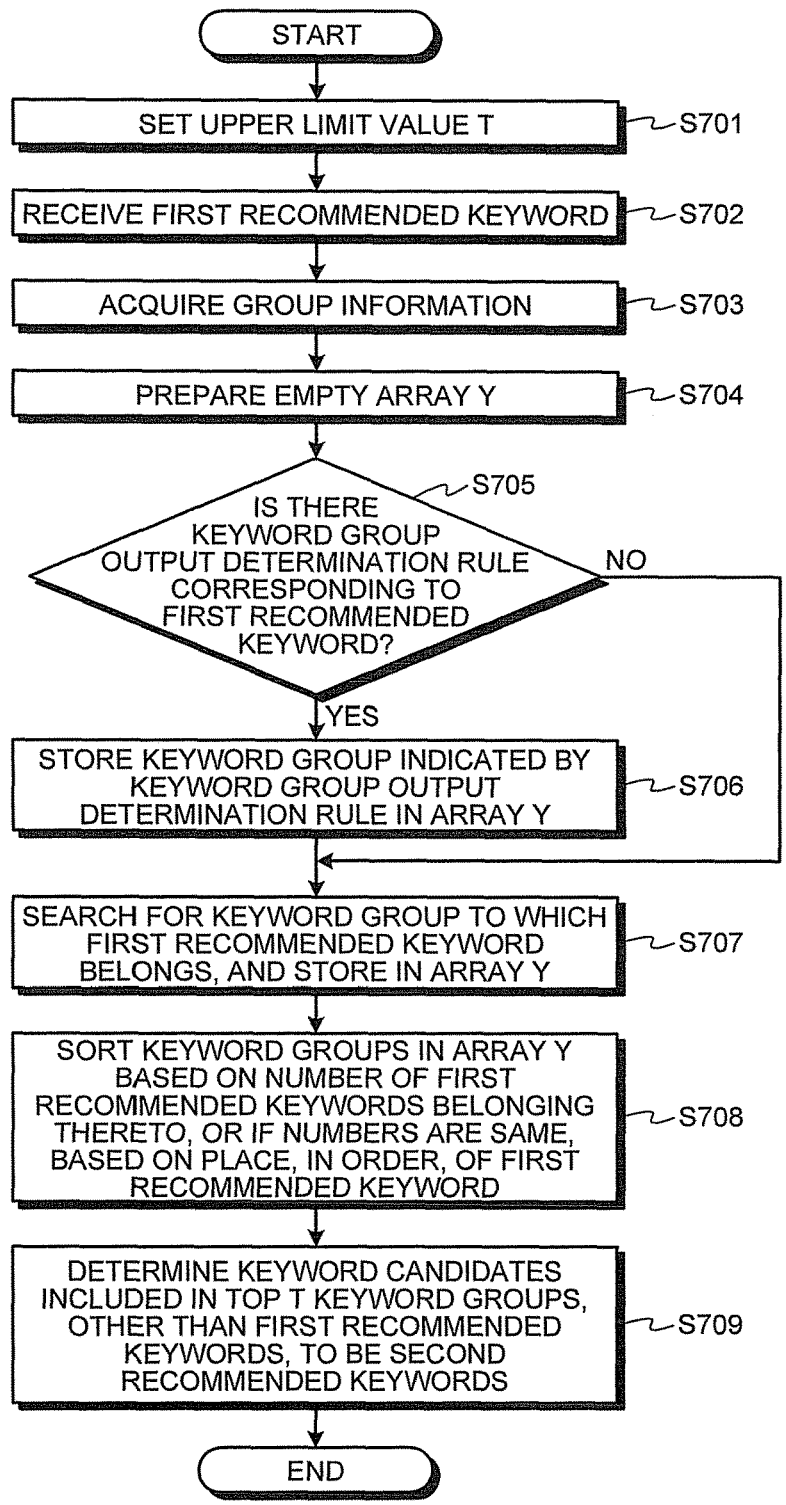
FIG. 23 is a flow chart illustrating an example of processing of a second recommended keyword acquisition unit of the fifth embodiment.

FIG. 23 is a flow chart illustrating an example of processing of the second recommended keyword acquisition unit 18E. The series of processes illustrated as the flow chart in FIG. 23 is repeatedly performed every time the first recommended keyword is changed. Additionally, the processes of steps S701 to S704 in the flow chart in FIG. 23 are the same as the processes of steps S301 to S304 in the flow chart in FIG. 9, and explanation, thereof is omitted.

After preparing an empty array Y in step S704, the second recommended keyword acquisition unit 18E then searches the keyword group output determination rule storage unit 22 and determines whether or not there is a keyword group output determination rule corresponding to the first recommended keyword received in step S702, that is, a keyword group output determination rule with a "keyword written expression" coinciding with the written expression of the first recommended keyword (step S705). Then, in the case there is a keyword group output determination rule corresponding to the first recommended keyword (step S705: Yes), the keyword group indicated by the keyword group output determination rule is stored at the top of the array Y (step S706), and the processing proceeds to step S707. On the other hand, in the case there is no keyword group output determination rule corresponding to the first recommended keyword (step S705: No), the processing directly proceeds to step S707.

Then, in the same manner as the second recommended keyword acquisition unit 18 of the first embodiment, the second recommended keyword acquisition unit 18E stores the keyword group to which the first recommended keyword belongs in the array Y (step S707), and sorts the keyword groups stored in the array Y in step S707 in the descending order of the number of first recommended keywords belonging thereto (step S708). Then, the second recommended keyword acquisition unit 18E extracts maximum T keyword groups from the top of the array Y, and determines the keyword candidates included in these keyword groups, other than the first recommended keywords, to be the second recommended keywords (step S709), transfers the second recommended keywords to the output unit 19, and ends the series of processes.

As described above, according to the search device 1E of the present embodiment, since second recommended keywords are acquired not only from the keyword group to which the first recommended keyword belongs, but also from a keyword group indicated by the keyword group output determination rule to be a keyword group relevant to the first recommended keyword, a variety of keyword candidates corresponding to an input string can be presented to a user. Accordingly, with the search device 1E of the present embodiment, an operation efficiency of a user regarding a search can be significantly increased.

Modified Example of Search Screen

Now, a modified example of search screens displayed on a search screen of the user terminal 2 by the search devices 1A to 1E of the respective embodiments described above will be described using example screens in FIGS. 24A and 24B. Each of FIG. 24A and FIG. 24B illustrates an example screen in a state where two keyword candidates "日本動物園 (nihon dobutsuen)" and "日本ドームシティ (nihon domu siti)" are displayed in the first display area 502 as the first recommended keywords as a result of input of characters "nihon" in the input form 501 by a user. In this state, in the present modified example, text information specifying a keyword group to which a first recommended keyword belongs or a keyword group relevant to a first recommended keyword is displayed, together with the first recommended keyword, in the first display area 502 as one option.

On a search screen 550 in FIG. 24(a), text information "display group" is uniformly displayed as text information specifying a keyword group regardless of a target keyword group. Also, on a search screen 560 in FIG. 24(b), a group name assigned to a target keyword group is displayed as text information specifying the keyword group, and here, "tourist sites in 東京" which is a group name of a keyword group to which "日本動物園" belongs and "list of events at 日本ドーム" which is a group name of a keyword group relevant to "日本ドームシティ" are displayed. Additionally, the group name of a keyword group may be manually attached to a target keyword group, or may be acquired from a specific document or dictionary data, in combination with the keyword group.

These pieces of text information are options that a user can select from, along with the first recommended keywords, and, for example, when the selected area 505 is moved to the position of text information, second recommended keywords included in the keyword group specified by the text information are displayed in the second display area 503.

In this manner, according to the present modified example, when text information displayed in the first display area 502 together with a first recommended keyword is selected, second recommended keywords included in the keyword group specified by the selected text information are displayed in the second display area 503, and thus, complication of the display on the search screen can be effectively suppressed, and also, appropriate keyword candidates suiting the intention of the user can be presented as the second recommended keywords. Furthermore, if, as in the example illustrated in FIG. 24(b), a group name of a keyword group is displayed as text information specifying the keyword group, the user is allowed to grasp the outline of keyword candidates to be presented as the second recommended keywords when the text information is selected, and the operation of the user is further simplified.

Each functional configuration of the search devices 1A to 1E of respective embodiments described above may be realized by executing a predetermined program by a computer, in a case a computer is used as a hardware configuration for the search devices 1A to 1E, for example. The program to be executed by the computer used as the search devices 1A to 1E is provided as a computer program product, being recorded in a computer-readable storage medium, such as a CD-ROM (Compact Disk Read Only Memory), a flexible disk (FD), a CD-R (Compact Disk Recordable) or a DVD (Digital Versatile Disc), as an installable file or an executable file.

A configuration is also allowed according to which the program to be executed by the computer used as the search devices 1A to 1E is stored on another computer connected to a network, such as the Internet, and is provided by being downloaded via the network. Furthermore, a configuration is also allowed according to which the program to be executed by the computer used as the search devices 1A to 1E is provided or distributed via a network, such as the Internet. Moreover, a configuration is also allowed according to which the program to be executed by the computer used as the search devices 1A to 15 is provided being embedded in ROM or the like in the computer in advance.

The program to be executed by the computer used as the search devices 1A to 15 is configured as a module including main structural elements of the search devices 1A to 1E (the first recommended keyword acquisition unit 17 or 17C, the second recommended keyword acquisition unit 18, 18B, 18C, 18D or 18E, the output unit 19, and the search unit 20), and as actual hardware, each of the structural elements mentioned above is loaded, and generated, on a primary storage device by the program being read, from a storage device, and executed by a CPU (a processor). Additionally, the main structural elements of the search devices 1A to 1E of the embodiments may be partially or wholly realized by using dedicated hardware such as an ASIC (Application Specific Integrated Circuit) or an FPGA (Field-Programmable Gate Array).

According to the search device of at least one embodiment described above, an operation efficiency of a user regarding a search may be significantly increased by including the keyword group storage unit 14 for storing a keyword group generated by grouping keyword candidates according to a rule set in advance, the first recommended keyword acquisition unit 17 or 17C for acquiring a first recommended keyword which is a keyword candidate partially including an input string not yet been entered, the second recommended keyword acquisition unit 18, 18B, 18C, 18D or 18E for acquiring a second recommended keyword which is included in the keyword group to which the first recommended keyword belongs and which is a keyword candidate other than the first recommended keyword, the output unit 19 for outputting a search screen for displaying the first recommended keyword and the second recommended keyword in a selectable way, and the search unit 20 for performing a search with the first recommended keyword or the second recommended keyword selected on the search screen as the search keyword.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A search device comprising:
   a first storage configured to store therein keyword candidates for a search keyword in advance;
   an input unit configured to receive an input operation of a character string by a user;
   a first acquisition unit configured to acquire first recommended keywords each of which is a keyword candidate including an input character string, the input character string being a character string which is partially entered by the user as the search keyword; and
   a search unit configured to select one of the acquired first recommended keywords selected on a search screen as the search keyword to perform a search with the search keyword;
   an output unit configured to output a search result on the search screen, wherein
   the search device further comprises,
   a second storage configured to store therein keyword candidates in association with keyword groups, the keyword groups grouping the keyword candidates for a search keyword stored in the first storage according to a rule set in advance;
   a second acquisition unit configured to acquire second recommended keywords each of which is a keyword candidate included in a keyword group to which an acquired first recommended keyword belongs and which is the keyword candidate other than the acquired first recommended keyword, wherein
   when the first acquisition unit acquires a plurality of first recommended keywords each of which includes the input character string, the second acquisition unit selects, among keyword groups to which at least one of the acquired first recommended keywords belongs, a predetermined number of the keyword groups in a descending order of the number of the acquired first recommended keywords belonging thereto, and acquires, as the second recommended keywords, the keyword candidates included in the selected keyword groups, and
   the search unit configured to sequentially select one of the acquired first recommended keywords and the acquired second recommended keywords on the search screen to perform a search with the sequentially selected one while the input character string is not repeatedly inputted.

2. The search device according to claim 1, wherein
   the first acquisition unit acquires the first recommended keywords every time the input string is changed,
   the second acquisition unit acquires the second recommended keywords every time the first recommended keyword is changed, and
   the output unit updates the search screen to be output every time at least one of the acquired first recommended keywords and the acquired second recommended keywords is changed.

3. The search device according to claim 1, wherein after the search is performed by the search unit, the acquired first recommended keywords and the acquired second recommended keywords, which have been displayed on the search screen before performing a search by the search unit, continue to be displayed while the input string remains unchanged.

4. The search device according to claim 1, further comprising:
   the first storage configured to store therein the keyword candidates collected in advance; and
   a generation unit configured to generate the keyword groups by grouping the keyword candidates stored in the first storage, wherein
   the second storage stores therein the keyword groups generated by the generation unit, and
   the first acquisition unit acquires the first recommended keywords from the first storage.

5. The search device according to claim 1, further comprising:
   a third storage configured to store therein history information indicating history of a search keyword used for a search by the search unit, wherein
   the second acquisition unit decides, based on the history information, the second recommended keywords to be acquired and an order of the second recommended keywords to be displayed on the search screen.

6. The search device according to claim 1, further comprising:
   a third storage configured to store therein history information indicating history of a search keyword used for a search by the search unit, wherein
   the first acquisition unit acquires, when the input unit receives no input operation by a user, as the first recommended keywords, the keyword candidate which is included in a keyword group to which a search keyword used in an immediately preceding search belongs and which is other than the search keyword used in the immediately preceding search, and then preferentially acquires, when the input unit receives input operation of a string by a user, as the first recommended keywords, the keyword candidate, among keyword candidates partially including the input string, which is included in the keyword group to which the search keyword used in the immediately preceding search belongs.

7. The search device according to claim 1, wherein the second acquisition unit acquires the second recommended keywords in a case the number of first recommended keywords acquired by the first acquisition unit is equal to or below a predetermined value set in advance.

8. The search device according to claim 1, further comprising:
   a fourth storage configured to store therein a group output determination rule indicating a correspondence relationship between a predetermined keyword candidate and a keyword group which is the keyword group to which the predetermined keyword candidate does not belong, but which is relevant to the predetermined keyword candidate, wherein
   when the first acquisition unit acquires, as the first recommended keyword, the predetermined keyword candidate, the second acquisition unit acquires, as the second recommended keywords, the keyword candidates included in the keyword group indicated by the group output determination rule as the keyword group relevant to the acquired first recommended keywords, in addition to the keyword candidates included in the keyword group to which the acquired first recommended keywords belong.

9. The search device according to claim 1, wherein the search screen includes a first display area where the acquired first recommended keywords are to be displayed, and a second display area where each of the acquired second recommended keywords is to be displayed, text information specifying the keyword group to which the acquired first recommended keywords belong is displayed together with the acquired first recommended keywords in the first display area in a selectable way, and in a case the text information is selected, a plurality of the keyword candidates each of which is included in the keyword group to which the acquired first recommended keywords belong and which is other than the acquired first recommended keywords is displayed in the second display area as the acquired second recommended keywords.

10. The search device according to claim 9, wherein the text information is a group name assigned to the keyword group.

11. A search method performed in a search device including a storage for storing therein keyword groups generated by grouping keyword candidates which are to be candidates for a search keyword according to a rule set in advance, the search method comprising:

receiving an input operation of a character string by a user;

acquiring first recommended keywords each of which is the keyword candidate partially including an input character string, the input character string being a character string which is input partially entered by the user as the search keyword; and selecting one of the acquired first recommended keywords on a search screen as the search keyword to perform a search with the search keyword;

outputting a search result on the search screen, wherein the search method comprises acquiring second recommended keywords each of which is a keyword candidate included in a keyword group to which an acquired first recommended keyword belongs and which is the keyword candidate other than the acquired first recommended keywords, the keyword candidates being associated with keyword groups, the keyword groups grouping the keyword candidates for a search keyword stored according to a rule set in advance, wherein when a plurality of first recommended keywords each of which includes the input character string is acquired by the first acquisition unit, the acquiring of the second recommended keyword includes selecting among keyword groups to which at least one of the acquired first recommended keywords belongs, a predetermined number of the keyword groups in a descending order of the number of the acquired first recommended keywords belonging thereto, and acquiring as the second recommended keywords, the keyword candidates included in the selected keyword groups, and the selecting includes sequentially selecting one of the acquired first recommended keywords and the acquired second recommended keywords on the search screen to perform a search with the sequentially selected one while the input character string is not repeatedly inputted.

12. A computer program product comprising a non-transitory computer-readable medium containing programmed instructions that cause a computer to execute:

receiving an input operation of a character string by a user;

acquiring first recommended keywords each of which is a keyword candidate partially including an input character string, the input character string being a character string which is input partially entered by the user as the search keyword; and selecting one of the acquired first recommended keywords on a search screen as the search keyword to perform a search with the search keyword;

outputting a search result on the search screen, wherein the search method further comprises acquiring second recommended keywords each of which is a keyword candidate included in a keyword group to which an acquired first recommended keyword belongs and which is the keyword candidate other than the acquired first recommended keywords, the keyword candidates being associated with keyword groups, the keyword groups grouping the keyword candidates for a search keyword stored according to a rule set in advance, wherein when a plurality of first recommended keywords each of which includes the input character string is acquired, the acquiring of the second recommended keywords including selecting, among keyword groups to which at least one of the acquired first recommended keywords belongs, a predetermined number of the keyword groups in a descending order of the number of the acquired first recommended keywords belonging thereto, and acquiring, as the second recommended keywords, the keyword candidates included in the selected keyword groups, and selecting includes sequentially selecting one of the acquired first recommended keywords and the acquired second recommended keywords on the search screen to perform a search with the sequentially selected on while the input character string is not repeatedly inputted.

13. The search device according to claim 1, wherein the first acquisition unit acquires, as the first recommended keywords, among keyword candidates whose forward part coincides with a written expression or reading of the input string that has not yet been entered as the search keyword and among keyword candidates partially coinciding with a written expression or reading of the input string that has not yet been entered as the search keyword, a predetermined number of the keyword candidates in a descending order of a score indicative of a priority level set in advance with respect to each of the keyword candidates.

14. The search device according to claim 13, wherein for the keyword groups with the number of the acquired first recommended keywords belonging thereto being the same, the second acquisition unit places a keyword group including the acquired first recommended keywords having the highest score at a higher position in the order.

* * * * *